United States Patent [19]
Matsuzawa et al.

[11] Patent Number: 5,617,176
[45] Date of Patent: Apr. 1, 1997

[54] SHAKE DETECTING AND DRIFT COMPONENT REMOVAL APPARATUS

[75] Inventors: Yoshinori Matsuzawa; Junichi Itoh, both of Hachioji; Yasuo Tanbara, Hino, all of Japan

[73] Assignee: Olympus Optical Co., Ltd., Tokyo, Japan

[21] Appl. No.: 404,302

[22] Filed: Mar. 14, 1995

[30]     Foreign Application Priority Data

Mar. 15, 1994   [JP]   Japan ..................................... 6-043655

[51] Int. Cl.⁶ ..................................................... G03B 7/08
[52] U.S. Cl. ...................................................... 396/55
[58] Field of Search .............................. 354/70, 202, 430; 348/208

[56]              References Cited

U.S. PATENT DOCUMENTS

| 4,856,882 | 8/1989 | Oshima et al. | 359/554 |
| 5,020,890 | 6/1991 | Oshima et al. | 359/554 |
| 5,062,696 | 11/1991 | Oshima et al. | 359/554 |
| 5,294,991 | 3/1994 | Oshima et al. | 348/208 |
| 5,479,236 | 12/1995 | Tanaka | 354/430 |

FOREIGN PATENT DOCUMENTS

| 60-143330 | 7/1985 | Japan . |
| 63-50729 | 3/1988 | Japan . |
| 5-204013 | 8/1993 | Japan . |

*Primary Examiner*—Safet Metjahic
*Assistant Examiner*—J. K. Han
*Attorney, Agent, or Firm*—Frishauf, Holtz, Goodman, Langer & Chick

[57]            ABSTRACT

A shake detecting apparatus includes a shake detecting sensor for detecting a shake and for outputting a shake detection signal responsive to the detected shake. A reference voltage output device is provided for outputting a reference voltage, and a differential amplifying device is provided for amplifying a difference between the shake detection signal output by the shake detecting sensor and the reference voltage output by the reference voltage output device. The differential amplifying device outputs a differential amplified signal, and a reference voltage controller is provided for modifying the reference voltage output by the reference voltage output device according to the differential amplified signal output by the differential amplifying device. A shake signal correcting device is provided for correcting the differential amplified signal output by the differential amplifying device according to the modified reference voltage output by the reference voltage output device, and for outputting a corrected differential amplified signal.

32 Claims, 11 Drawing Sheets

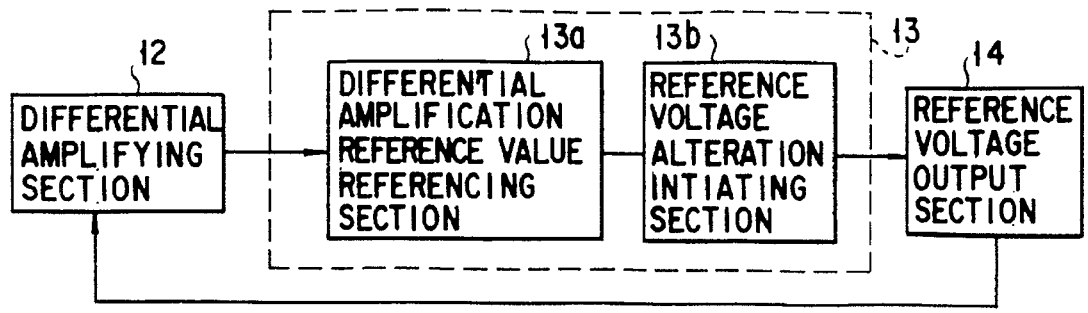
F I G. 7
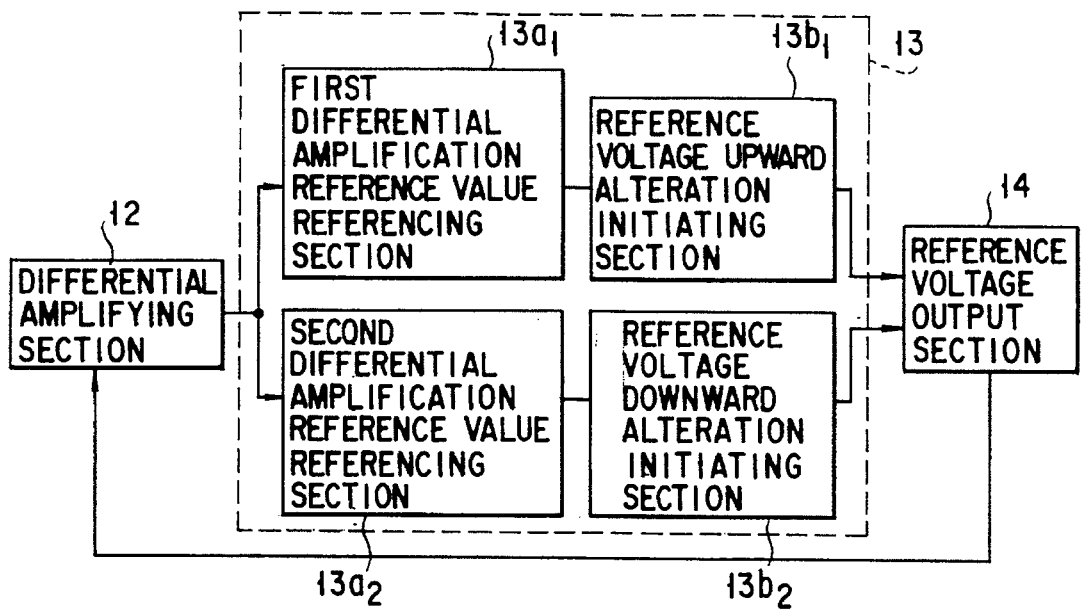
F I G. 8
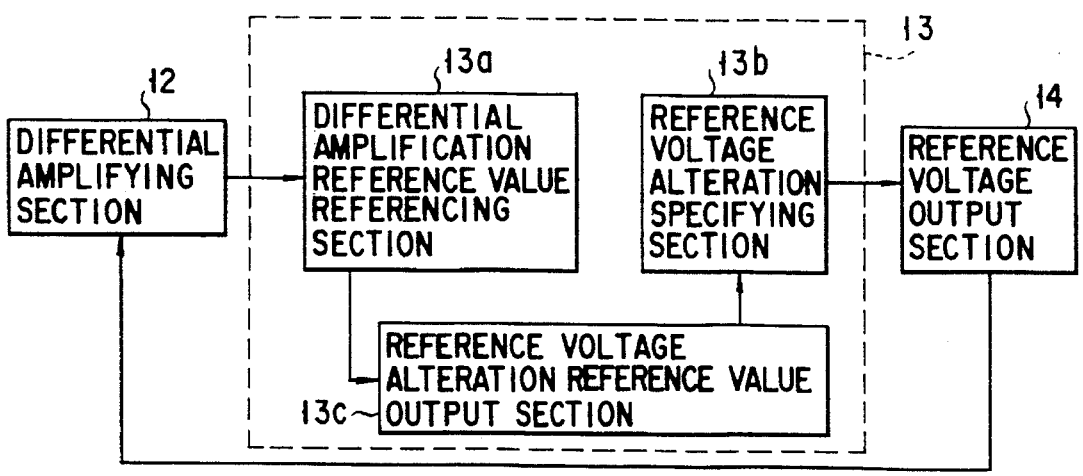
F I G. 9

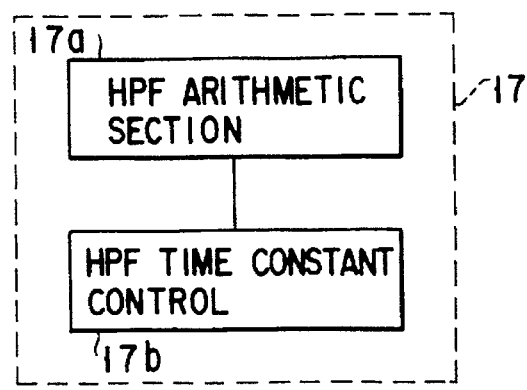
F I G. 11
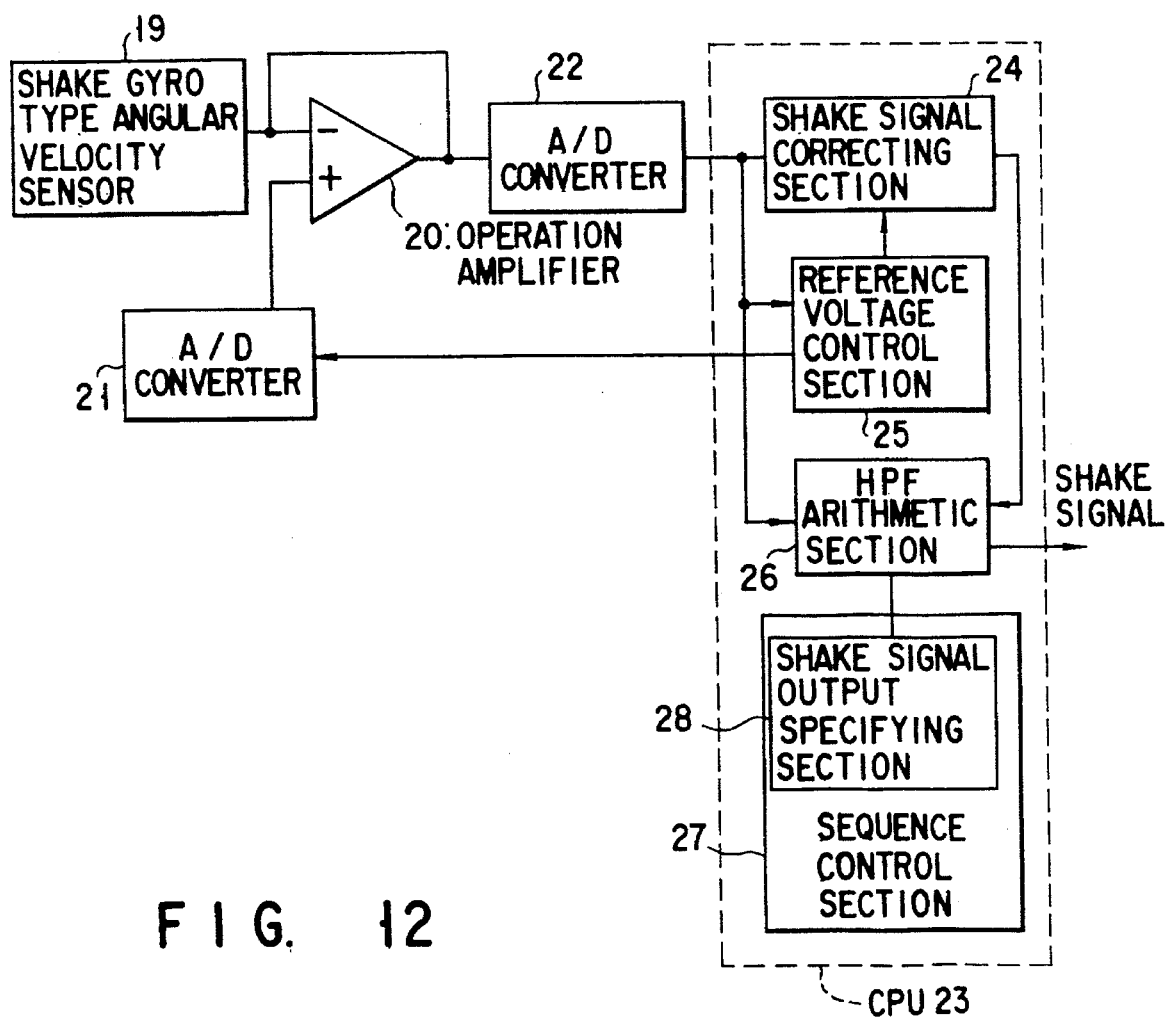
F I G. 12

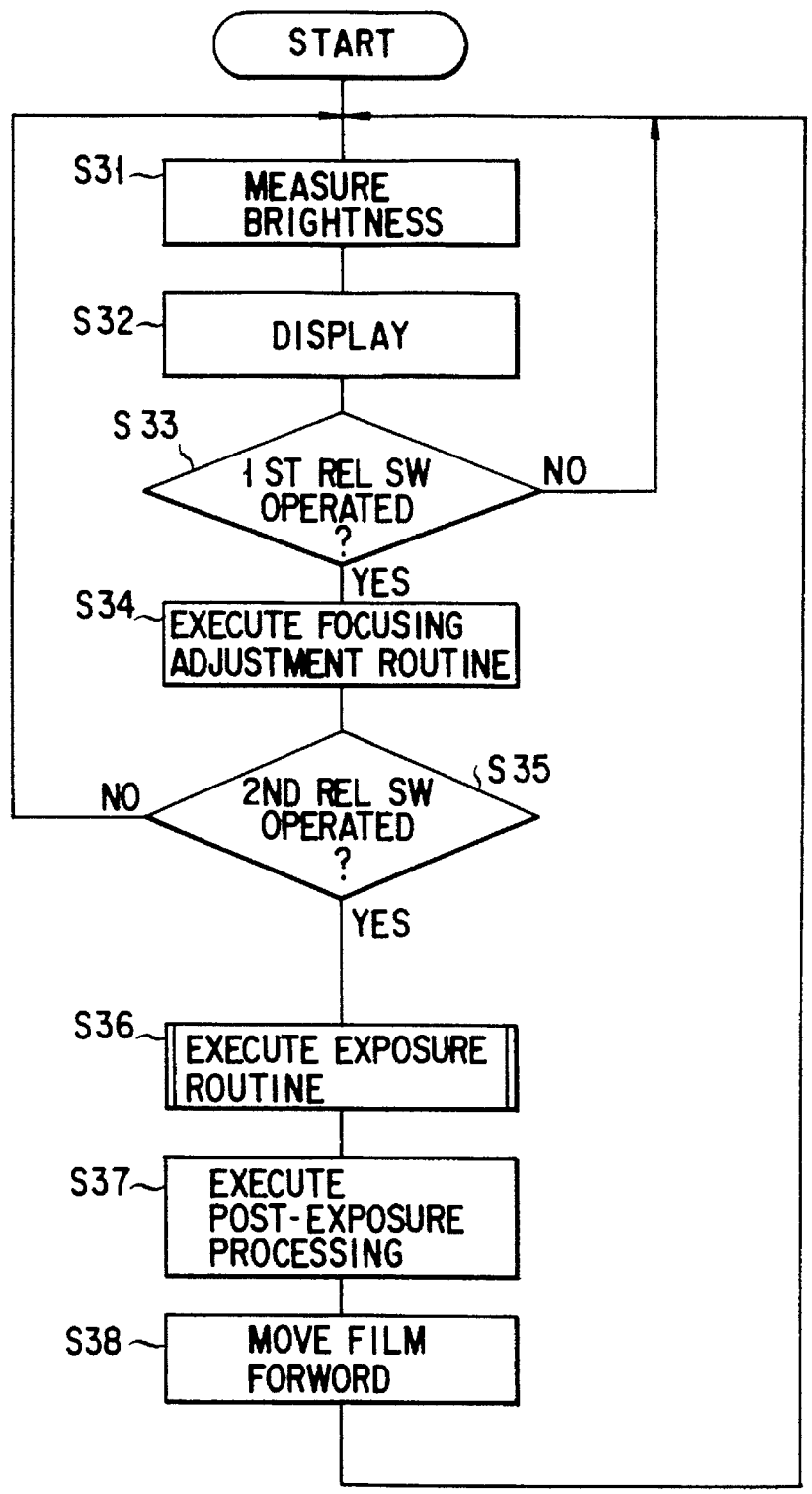
F I G. 14

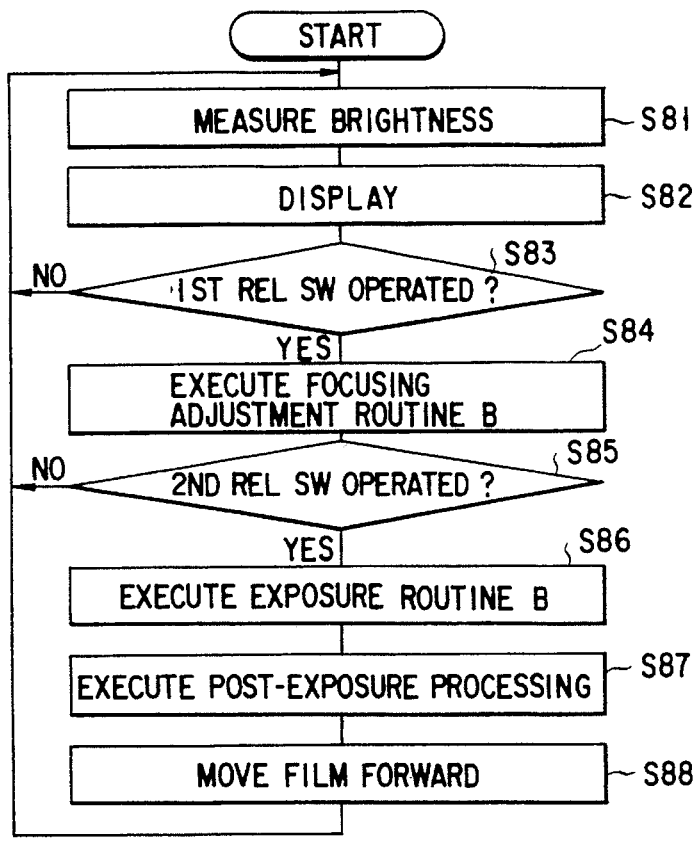
F I G. 16
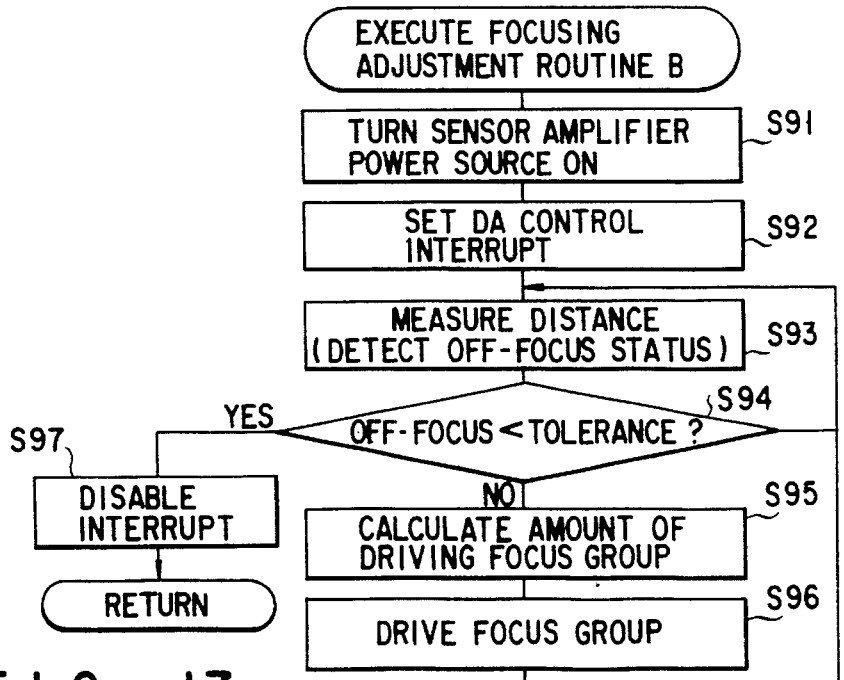
F I G. 17

SHAKE DETECTING AND DRIFT COMPONENT REMOVAL APPARATUS

BACKGROUND OF THE INVENTION

1. Field of the Invention

The present invention relates to a shake detecting apparatus and, more particularly, to a shake detecting apparatus that can be used as a device to be installed in a camera or other image shooting apparatus for the prevention of blurred pictures.

2. Description of the Related Art

Acceleration sensors, angular velocity sensors and rate gyros have conventionally been used for shake detecting apparatuses. Such shake detecting apparatuses are on the trend of down-sizing which is a current phenomenon widely observed in the field of electronic devices. However, as for shake detecting apparatuses, down-sizing can often result in a less accurate performance because output signals become more susceptible to drifts, offsets and other adverse effects that can be caused to by changes in the ambient temperature and/or the temperature of each apparatus itself. While the use of a piezoelectric device has been proposed as an effective means of down-sizing shake detecting apparatuses, such a device is particularly susceptible to drifts due to fluctuations not only in the physical dimensions but also in the capacitance that appear as a result of temperature changes.

FIG. 18 of the accompanying drawings schematically illustrates changes that can take place in the output signal of a shake gyro type angular velocity sensor in the initial stages of activation that operates as a shake detector. The horizontal and vertical axes respectively represent the elapsed time after energizing and the output level of the sensor. If the sensor is held stable, or not moved, its output signal changes rapidly for tens of several tens milliseconds (or 50 milliseconds in FIG. 18) after it is energized. During this period, the output rises quickly up to a little below its normal level (so-called "null voltage") if it is not subjected to a shake.

Thereafter, for several hundred milliseconds (for example, 300 milliseconds in FIG. 18), the output signal plunges into initial unstable stages, during which the output level mildly rises from a little below the null voltage to just the null voltage. When the initial unstable stages are over, the output level is totally stabilized as it moves into a stabilized normal phase of operation and does not show remarkable changes any longer.

In FIG. 18, the broken line indicates the output level of the sensor if it is subjected to a shake.

In a longer time span, however, the null voltage would change with time, or drift, although the output level is in the stabilized normal phase as a function of changes mainly in the ambient temperature.

While fluctuations of the null voltage attributable mainly to changes in the ambient temperature occur very slowly, probably a cyclic phenomenon with a period of several minutes, they still give rise to errors in the shake signal of the sensor. If the shake signal is used with errors due to drifts without taking any corrective measures, they remain in the signal and become amplified to immaturely and erroneously produce a saturated state in the sensor as the signal is amplified for use. Once a saturated state occurs in the sensor, it no longer can produce proper shake signals.

Japanese Patent Application KOKAI Publication No. 60-143330 discloses the use of a high-pass filter for removing low frequency components of the output signal of a shake gyro type angular velocity sensor. According to the cited document, the upper limit of frequency is specified for the high-pass filter so that it blocks any low frequency components of the signal below the specified level. The cut-off frequency and the time constant of a filter are inversely proportional. When a sensor and a filter to be used with the sensor are energized and if the upper limit of frequency for frequency cut-off specified for the filter is f, it takes a period of time equal to its time constant or $2\pi/f$ seconds before the output signal of the sensor is stabilized. An extra time period may have to be added to this time period to remove errors that may be given rise to by noises and other causes on the part of the sensor.

FIG. 20 shows a block diagram of a typical known arrangement for detecting a shake by using a shake gyro type angular velocity sensor. Referring to FIG. 20, the output signal of shake gyro type angular velocity sensor 1 is made to pass through high-pass filter (HPF) 2 that removes error components due to drifts and then amplified by amplifier 3 to a desired signal level. A voltage regulator 4 is arranged downstream relative to the amplifier 3 in order to cancel out the offset components of the signal generated by the amplifier 3 and make the output level of the signal get to the specified null voltage.

For detecting a shake of an image shooting apparatus produced by some external cause, it should be noted that the frequency of such a shake is low and about 15 Hz at most while the amplitude of such a low frequency vibration is typically large. Therefore, the use of a high-pass filter (HPF) having a large time constant is necessary to remove drifts in the output signal of the sensor without significantly attenuating the signal.

If a sensor of the type under consideration is used with a still camera, low frequency vibrations that may be applied to the camera cannot be removed by the photographer using the camera because he or she can hardly sense them instantaneously while taking a picture or depressing the shutter button. This is unlike the case of a video camera with which the operator of the camera can sense such vibrations as he or she watches the target through a view finder for a certain period of time. So, the net result will be an objectionably blurred picture. Means should be provided to avoid such a blurred picture by detecting low frequency vibrations and such means will be an HPF with a time constant of tens of several seconds.

FIG. 21 is a graph showing the relationship between the elapsed time after the start of operation of the arrangement of FIG. 20 and the output level of the HPF. As seen from FIG. 21, a considerable time period has to be provided until the output of the HPF is stabilized and the time period corresponds to the time constant of the filter. This is mainly because the input to the HPF remarkably changes in the initial stages of operation to reflect the abrupt change in the output of the sensor that occurs when it is energized.

Japanese Patent Application KOKAI Publication No. 63-50729 discloses an arrangement comprising an acceleration sensor and a plurality of integrators provided with respective HPFs with different time constants, wherein the integrators are selectively used for the operation of integration to be carried out for the acceleration sensor in order to minimize the time period of the initial unstable stages of the filter.

However, even with the arrangement of the above cited Japanese Patent Application KOKAI Publication No. 63-50729, the initial unstable stages last for a considerable period of time because the input to the HPF changes remarkably, reflecting the abrupt change in the output of the sensor that takes place when it is energized, although the arrangement is not without improvements.

Thus, the problem of drifts of a shake sensor is closely related with the time period required for the output of a shake detecting apparatus comprising such a sensor to become stabilized.

Points that have to be dealt with here are (1) the drift of the sensor and (2) the time period required for the HPF to remove the drift and stabilize its output.

For removing drifts by means of an HPF, using either of the techniques disclosed in the above cited Japanese Patent Application KOKAI Publications Nos. 60-143330 and 63-50729, the aggregate of the shake signal (angular velocity signal, acceleration signal) and the drift components needs to be found with a voltage range allowable for the input to the HPF. For instance, if a shake gyro type angular velocity sensor is used, drifts that are caused by temperature changes can be tens of several times as large as the angular velocity to be detected for the image shooting apparatus provided with the sensor may be involved. To cope with such drifts, the output of the sensor has to be amplified after passing through an HPF. However, an amplifier to be used for amplifying the output of the sensor can also be liable to generate drifts if they are small when compared with those of the sensor and offsets so that it may be necessary to arrange an additional HPF and/or a regulator in order to remove such offsets and drifts, making the entire circuit arrangement unacceptably complicated.

Another problem that needs to be solved for conventional shake detecting apparatus is that it takes a considerably period of time for the apparatus to determine if the output of the HPF has been stabilized or not because drifts are relatively large with regard to the effective signal level of the apparatus.

As a greater number of HPFs are used for a shake detecting apparatus, the entire circuit configuration of the apparatus inevitably becomes increasingly complex. While the operation of eliminating drifts can be carried out smoothly if a large number of HPFs with different time constants are used, such an arrangement can make the circuit configuration unacceptably complicated.

Additionally, while the above described technique of utilizing a plurality of HPFs involves the use of analog signals, the shake signal of the shake detecting apparatus representing the detected shake is processed digitally by means of a CPU (central processing unit) or a DSP (digital signal processor) after the completion of certain regulating operations such as the operation of regulating the reference voltage or the null voltage of the apparatus representing a no shake state of the image shooting apparatus that are required to be carried out before any shake signal is fed to the CPU or DSP by way of an A/D (analog/digital) converter. Without such regulating operations, the shake detecting apparatus does not work properly.

Such regulating operations are carried out typically by means of a trimmer resistor or a similar device before the shipment of the apparatus. Any errors involved in the regulating operations are directly reflected in the shake signal of the apparatus. If, for example, a shake correcting apparatus comprising shake detecting means is concerned, it can mistakenly operate to correct a non-existent shake if a series of regulating operations have not been carried out properly on the apparatus before the shipment.

Still another problem that needs to be solved for the conventional shake detecting apparatus is that, if the null voltage is shifted with time (due to drifts and/or offsets generated in the amplifying circuit of the apparatus) while the apparatus is in service, the shift cannot be corrected and the apparatus becomes inoperative. Note that such a shift of the null voltage can take place if the signal processing operation is an analog signal processing operation.

If the circuit of the shake detecting apparatus is so configured as to directly remove drifts out of the input fed from the sensor to a virtual HPF where a set of programs operate to remove drifts like as a real HPF does, the shake signal containing drift components therein has to be digitized, requiring the use of an A/D converter having a high resolution in the circuit when compared with the case where the shake signal containing no drift components. Again, such an arrangement makes the circuit complicated and requires a high degree of precision on the part of the A/D converter.

The apparatus may alternatively be so arranged that the output of the sensor of the apparatus is made to pass through an analog HPF and an amplifier before it is digitized and regulated again in a virtual HPF realized by a set of programs and operated by the CPU for additionally regulating any possible shift of the null voltage. With such an arrangement, however, the initial performance of the analog HPF remains unimproved.

SUMMARY OF THE INVENTION

It is, therefore, an object of the present invention to provide a new improved shake detecting apparatus which can operate accurately, quickly and stably by solving the above identified problems that (1) drifts can be generated in the sensor to such an extent that they overflow a voltage range that can be properly processed by a processing circuit, (2) drifts generated in the sensor require a long time period before they are removed by one or more than one HPFs to produce a stabilized HPF output signal, (3) a complex circuit configuration is required for controlling the time constants of the HPFs in a multiple HPF arrangement, (4) the null voltage of the apparatus needs to be regulated typically before the shipment of the apparatus if it involves digital processing operations and (5) the amplifying circuit of the apparatus can also generate drifts and offsets.

According to a first aspect of the present invention, the above object is achieved by providing a shake detecting apparatus comprising a shake detecting sensor means for detecting a shake, a reference voltage output means for producing a reference voltage, a differential amplifying means for amplifying the difference between the shake detecting sensor means and the reference voltage output means, a reference voltage control means for modifying the reference voltage produced by the reference voltage output means according to the output of the differential amplifying means and a shake signal correcting means for correcting the output of the differential amplifying means according to the modification of the reference voltage by the reference voltage control means.

According to a second aspect of the invention, there is provided a shake detecting apparatus comprising a shake detecting sensor means for detecting a shake, a reference voltage output means for producing a reference voltage, a differential amplifying means for amplifying the difference between the shake detecting sensor means and the reference voltage output means, a reference voltage control means for modifying the reference voltage produced by the reference voltage output means according to the output of the differential amplifying means, a shake signal correcting means for correcting the output of the differential amplifying means according to the modification of the reference voltage by the reference voltage control means and a shake signal output specifying means for specifying the initial value for and the timing of producing a differential signal from the shake signal correcting means.

According to a third aspect of the invention, there is provided a shake detecting apparatus comprising a shake detecting sensor means for detecting a shake, a reference voltage output means for producing a reference voltage, a differential amplifying means for amplifying the difference between the shake detecting sensor means and the reference voltage output means, a reference voltage control means for modifying the reference voltage produced by the reference voltage output means according to the output of the differential amplifying means, a shake signal correcting means for correcting the output of the differential amplifying means according to the modification of the reference voltage by the reference voltage control means and a high-pass filter arithmetic means for removing changes in the shake signal of the apparatus caused by mild drifts through high-pass filter arithmetic operations on the basis of the output of the shake signal correcting means.

According to a fourth aspect of the invention, there is provided a shake detecting apparatus comprising a shake detecting sensor means for detecting a shake, a reference voltage output means for producing a reference voltage, a differential amplifying means for amplifying the difference between the shake detecting sensor means and the reference voltage output means, a reference voltage control means for modifying the reference voltage produced by the reference voltage output means according to the output of the differential amplifying means, a shake signal correcting means for correcting the output of the differential amplifying means according to the modification of the reference voltage by the reference voltage control means, a high-pass filter arithmetic means for performing arithmetic operations on the basis of the output of the shake signal correcting means and a shake signal output specifying means for specifying the initial value for and the timing of producing a shake signal from either the shake high-pass filter arithmetic means or the shake signal correcting means.

According to a fifth aspect of the invention, there is provided a shake detecting apparatus comprising a shake detecting sensor means for detecting a shake, a reference voltage output means for producing a reference voltage, a differential amplifying means for amplifying the difference between the shake detecting sensor means and the reference voltage output means, an A/D converter means for digitizing the output of the differential amplifying means, a reference voltage control means for modifying the reference voltage produced by the reference voltage output means according to the output of at least either the differential amplifying means or the A/D converter means, a shake signal correcting means for correcting the output of the A/D converter means according to the modification of the reference voltage by the reference voltage control means, a high-pass filter arithmetic means for performing arithmetic operations on the basis of the output of the shake signal correcting means and a shake signal output specifying means for specifying the initial value for and the timing of producing a differential signal from either the shake high-pass filter arithmetic means or the shake signal correcting means.

In a shake detecting apparatus according to the first aspect of the invention, the shake detecting sensor means detects a shake and the reference voltage output means produces a reference voltage. The difference between the output of the shake detecting sensor means and the reference voltage output means is amplified by the differential amplifying means. Then, the reference voltage produced by the reference voltage output means is modified by the reference voltage control means according to the output of the differential amplifying means. The output of the differential amplifying means is corrected by the shake signal correcting means according to the modification of the reference voltage by the reference voltage control means.

In a shake detecting apparatus according to the second aspect of the invention, the shake detecting sensor means detects a shake and the reference voltage output means produces a reference voltage. The difference between the output of the shake detecting sensor means and the reference voltage output means is amplified by the differential amplifying means. Then, the reference voltage produced by the reference voltage output means is modified by the reference voltage control means according to the output of the differential amplifying means. The output of the differential amplifying means is corrected by the shake signal correcting means according to the modification of the reference voltage by the reference voltage control means and then the initial value for and the timing of producing a differential signal from the shake signal correcting means is specified by the shake signal output specifying means.

In a shake detecting apparatus according to the third aspect of the invention, the shake detecting sensor means detects a shake and the reference voltage output means produces a reference voltage. The difference between the output of the shake detecting sensor means and the reference voltage output means is amplified by the differential amplifying means. Then, the reference voltage produced by the reference voltage output means is modified by the reference voltage control means according to the output of the differential amplifying means. The output of the differential amplifying means is corrected by the shake signal correcting means according to the modification of the reference voltage by the reference voltage control means. Changes in the shake signal of the apparatus caused by mild drifts are removed by the high-pass filter arithmetic means through high-pass filter arithmetic operations on the basis of the output of the shake signal correcting means.

In a shake detecting apparatus according to the fourth aspect of the invention, the shake detecting sensor means detects a shake and the reference voltage output means produces a reference voltage. The difference between the output of the shake detecting sensor means and the reference voltage output means is amplified by the differential amplifying means. Then, the reference voltage produced by the reference voltage output means is modified by the reference voltage control means according to the output of the differential amplifying means. The output of the differential amplifying means is corrected by the shake signal correcting means according to the modification of the reference voltage by the reference voltage control means. Arithmetic operations are performed by the high-pass filter arithmetic means on the basis of the output of the shake signal correcting means. Then, the initial value for and the timing of producing a shake signal from either the shake high-pass filter arithmetic means or the shake signal correcting means are specified by the shake signal output specifying means.

In a shake detecting apparatus according to the fifth aspect of the invention, the shake detecting sensor means detects a shake and the reference voltage output means produces a reference voltage. The difference between the output of the shake detecting sensor means and the reference voltage output means is amplified by the differential amplifying means. Then, the output of the differential amplifying means is turned into digital signals by the A/D converter means and the reference voltage produced by the reference voltage output means is modified by the reference voltage output means according to the output of at least either the differential amplifying means or the A/D converter means. The output of the A/D converter means is corrected by the shake signal correcting means according to the modification of the reference voltage by the reference voltage control means and arithmetic operations are performed by the high-pass filter arithmetic means on the basis of the output of the shake signal correcting means. Then, the initial value for and the timing of producing a differential signal from either the shake high-pass filter arithmetic means or the shake signal correcting means are specified by the shake signal output specifying means.

Additional objects and advantages of the invention will be set forth in the description that follows and in part will be obvious from the description or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiment given below, serve to explain the principles of the invention.

FIG. 7 is a block diagram of the reference voltage control section 13 and a possible arrangement of its peripheral sections that can be used for the first embodiment of the present invention;

FIG. 8 is a block diagram of the reference voltage control section 13 and another possible arrangement of its peripheral sections that can also be used for the first embodiment of the present invention;

FIG. 9 is a block diagram of the reference voltage control section 13 and still another possible arrangement of its peripheral sections that can also be used for the first embodiment of the present invention;

FIG. 11 is a block diagram of the HPF arithmetic section 17 of the third embodiment;

FIG. 12 is a block diagram of a principal portion of the second embodiment of shake detecting apparatus according to the present invention;

FIG. 14 is a flow chart of a possible basic operation of a camera provided with a shake detecting apparatus according to the present invention;

FIG. 16 is a flow chart of another possible basic operation of a camera provided with a shake detecting apparatus according to the present invention;

FIG. 17 is a flow chart of the operation of the focusing adjustment B in FIG. 16;

DETAILED DESCRIPTION OF THE PREFERRED EMBODIMENTS

Figure 1:
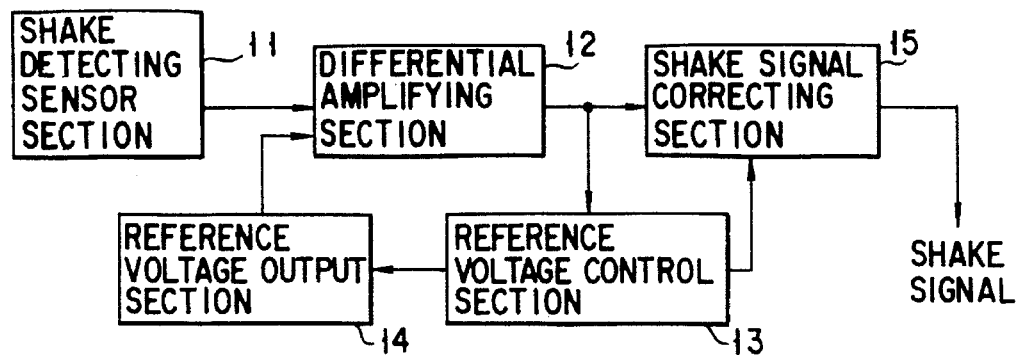
FIG. 1 is a block diagram of a first possible configuration of shake detecting apparatus according to a first embodiment of the present invention.

Reference will now be made in detail to the presently preferred embodiments of the invention as illustrated in the accompanying drawings, in which like reference characters designate like or corresponding parts throughout the several drawings.

FIG. 1 shows a block diagram of a first possible configuration of shake detecting apparatus according to a first embodiment of the present invention.

As seen from FIG. 1, as the shake detecting sensor section 11 of the first embodiment of the present invention having the illustrated first possible configuration detects a shake, the difference between the output signal of the shake detecting sensor section 11 and the reference voltage produced by the reference voltage output section 14 is amplified by the differential amplifying section 12. Then, the reference voltage control section 13 raises or lowers the reference voltage of said reference voltage output section 14 according to the output of the differential amplifying section 12. Subsequently, the shake signal correcting section 15 corrects the output of the differential amplifying section 12 according to the modification of the reference voltage by the reference voltage control section 13.

The arrangement of the first embodiment shown in FIG. 1 basically operates as an improved amplifier for amplifying the output of the shake detecting sensor that operates not to produce a saturated state for the amplified output if drifts are generated in the sensor so that only the component of the signal representing the shake can be extracted in subsequent processing operations.

Figure 2:
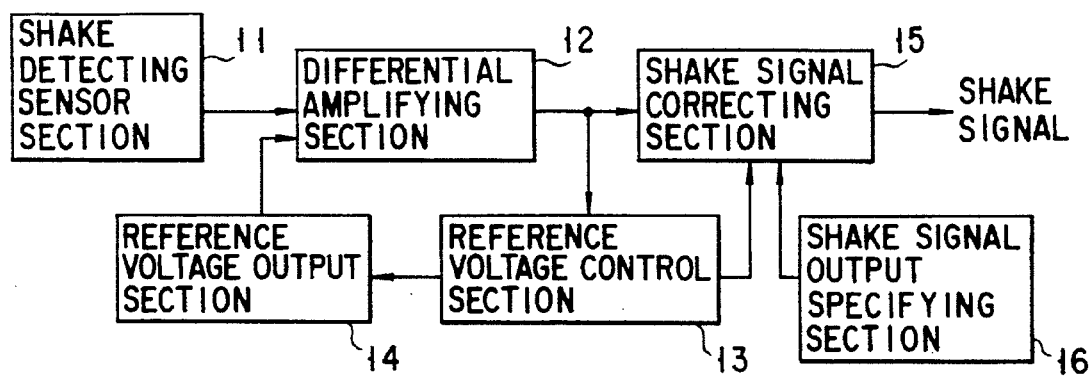
FIG. 2 is a block diagram of a second possible configuration of shake detecting apparatus according to a second embodiment of the present invention.

FIG. 2 is a block diagram of a second possible configuration of shake detecting apparatus according to a second embodiment of the present invention.

As shown in FIG. 2, the second embodiment of the invention comprises a shake detecting sensor section 11, a reference voltage output section 14, a differential amplifying section 12 for amplifying the difference of the output of the shake detecting sensor section 11 and that of the reference voltage output section 14, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of the reference voltage by the reference voltage control section 13 and a shake signal output specifying or setting section 16 for specifying or setting the initial value for and the timing of producing an output signal by the shake signal correcting section 15.

With the arrangement of the second embodiment of shake detecting apparatus, as the shake detecting sensor section 11 of the first embodiment of the invention having the illustrated first possible configuration detects a shake, the difference between the output signal of the shake detecting sensor section 11 and the reference voltage produced by the reference voltage output section 14 is amplified by the differential amplifying section 12. Then, the reference voltage control section 13 raise or lowers the reference voltage of said reference voltage output section 14 according to the output of the differential amplifying section 12. Subsequently, the shake signal correcting section 15 corrects the output of the differential amplifying section 12 according to the modification of the reference voltage by the reference voltage control section 13. Finally, the initial value for and the timing of producing an output signal by the shake signal correcting section 15 are specified by the shake signal output specifying section 16.

The arrangement of the second embodiment shown in FIG. 2 basically operates as an improved amplifier for amplifying the output of the shake detecting sensor that operates not to produce a saturated state for the amplified output if drifts are generated in the sensor and with which the initial value of the output signal of the apparatus can be specified.

Figure 3:
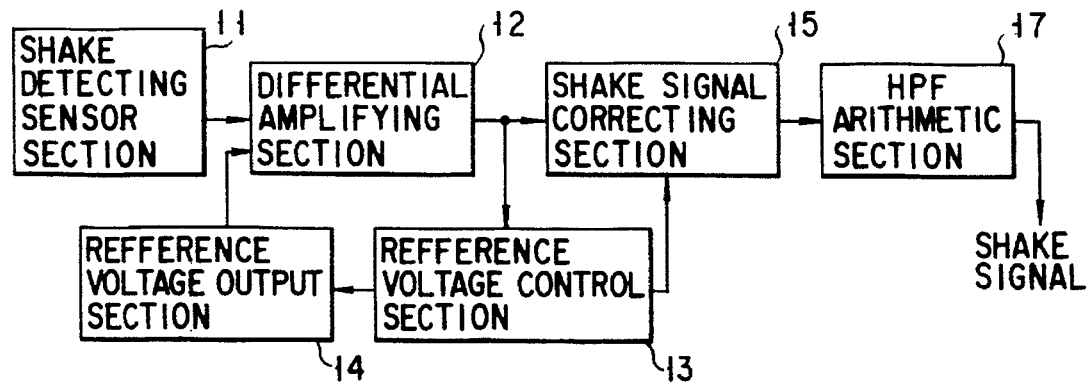
FIG. 3 is a block diagram of a third possible configuration of shake detecting apparatus according to a third embodiment of the present invention.

FIG. 3 is a block diagram of a third possible configuration of shake detecting apparatus according to a third embodiment of the present invention.

As shown in FIG. 3, the third embodiment of the present invention comprises a shake detecting sensor section 11, a reference voltage output section 14, a differential amplifying section 12 for amplifying the difference of the output of the shake detecting sensor section 11 and that of the reference voltage output section 14, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of the reference voltage by the reference voltage control section 13 and an HPF arithmetic section 17 for removing changes in the shake signal of the apparatus caused by mild drifts through HPF arithmetic operations on the basis of the output of the shake signal correcting section 15.

With the arrangement of the third embodiment of shake detecting apparatus, as the shake detecting sensor section 11 of the first embodiment of the present invention having the illustrated first possible configuration detects a shake, the difference between the output signal of the shake detecting sensor section 11 and the reference voltage produced by the reference voltage output section 14 is amplified by the differential amplifying section 12. Then, the reference voltage control section 13 raise or lowers the reference voltage of said reference voltage output section 14 according to the output of the differential amplifying section 12. Subsequently, the shake signal correcting section 15 corrects the output of the differential amplifying section 12 according to the modification of the reference voltage by the reference voltage control section 13. Finally, changes in the shake signal of the apparatus caused by mild drifts are removed by the HPF arithmetic section 17 through HPF arithmetic operations on the basis of the output of said shake signal correcting section 15.

The arrangement of the third embodiment shown in FIG. 3 basically operates as an improved amplifier for amplifying the output of the shake detecting sensor that operates not to produce a saturated state for the amplified output if drifts are generated in the sensor so that only the component of the signal representing the shake can be extracted in subsequent processing operations.

Figure 4:
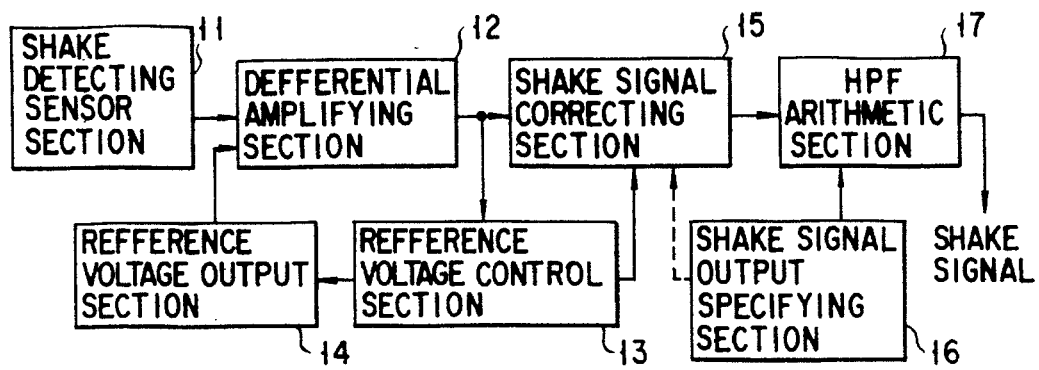
FIG. 4 is a block diagram of a fourth possible configuration of shake detecting apparatus according to a fourth embodiment of the present invention.

FIG. 4 is a block diagram of a fourth possible configuration of shake detecting apparatus according to a fourth embodiment of the present invention.

As shown in FIG. 4, the fourth embodiment of the present invention comprises a shake detecting sensor section 11, a reference voltage output section 14, a differential amplifying section 12 for amplifying the difference of the output of the shake detecting sensor section 11 and that of the reference voltage output section 14, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of the reference voltage by the reference voltage control section 13, an HPF arithmetic section 17 for performing arithmetic operations on the basis of the output of the shake signal correcting section 15 and a shake signal output specifying section 16 for specifying the initial value for and the timing of producing a shake signal from either said HPF arithmetic section 17 or said shake signal correcting section 15.

With the arrangement of the fourth embodiment of shake detecting apparatus, as the shake detecting sensor section 11 of the first embodiment of the invention having the illustrated first possible configuration detects a shake, the difference between the output signal of the shake detecting sensor section 11 and the reference voltage produced by the reference voltage output section 14 is amplified by the differential amplifying section 12. Then, the reference voltage control section 13 raise or lowers the reference voltage of said reference voltage output section 14 according to the output of the differential amplifying section 12. Subsequently, the shake signal correcting section 15 corrects the output of the differential amplifying section 12 according to the modification of the reference voltage by the reference voltage control section 13. Then, changes in the shake signal of the apparatus caused by mild drifts are removed by the HPF arithmetic section 17 through HPF arithmetic operations on the basis of the output of said shake signal correcting section 15. Finally, the initial value for and the timing of producing a shake signal from either HPF arithmetic section 17 or said shake signal correcting section 15 are specified by the shake signal output specifying section 16.

Again, the arrangement of the fourth embodiment shown in FIG. 4 basically operates as an improved amplifier for amplifying the output of the shake detecting sensor that operates not to produce a saturated state for the amplified output if drifts are generated in the sensor so that only the component of the signal representing the shake can be extracted in subsequent processing operations.

Figure 5:
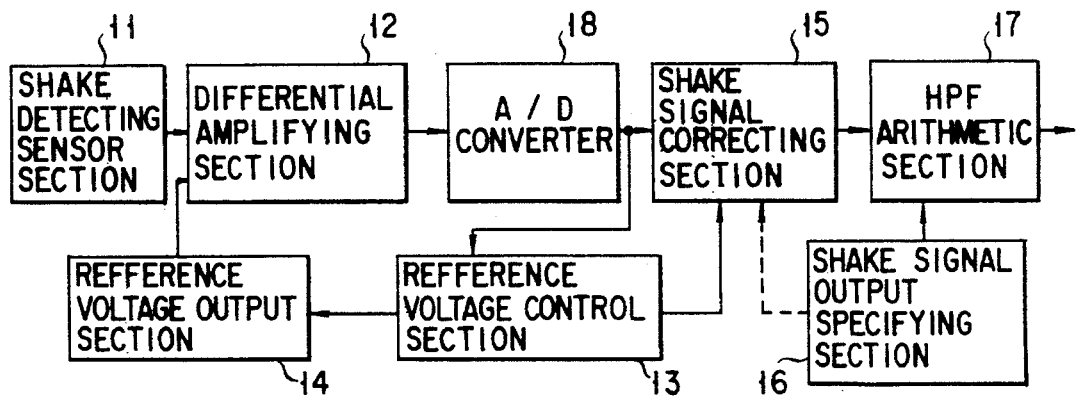
FIG. 5 is a block diagram of a fifth possible configuration of shake detecting apparatus according to a fifth embodiment of the present invention.

FIG. 5 is a block diagram of a fifth possible configuration of shake detecting apparatus according to a fourth embodiment of the invention.

As shown in FIG. 5, the fifth embodiment of the invention comprises a shake detecting sensor section 11, a reference voltage output section 14, a differential amplifying section 12 for amplifying the difference of the output of the shake detecting sensor section 11 and that of the reference voltage output section 14, an A/D converter section 18 for converting the output of the differential amplifying section 12 into a digital signal, a reference voltage control section 13 for raising or lowering the reference voltage produced by the reference voltage output section 14 according to the output of the differential amplifying section 12 and referring to a set of predetermined values, a shake signal correcting section 15 for correcting the value of the amplified differential of the differential amplifying section 12 produced by the A/D converter section 18 according to the modification of the reference voltage by the reference voltage control section 13, an HPF arithmetic section 17 for performing arithmetic operations on the basis of the output of the shake signal correcting section 15 and a shake signal output specifying section 16 for specifying the initial value for and the timing of producing a shake signal from either said HPF arithmetic section 17 or said shake signal correcting section 15.

With the arrangement of the fifth embodiment of shake detecting apparatus, as the shake detecting sensor section 11 of the first embodiment of the invention having the illustrated first possible configuration detects a shake, the difference between the output signal of the shake detecting sensor section 11 and the reference voltage produced by the reference voltage output section 14 is amplified by the differential amplifying section 12. Then, the output of the differential amplifying section 12 is converted into a digital signal by the A/D converter section 18 and the reference voltage control section 13 raise or lowers the reference voltage of said reference voltage output section 14 according to the output of at least either the differential amplifying section 12 or the A/D converter section 18. Subsequently, the shake signal correcting section 15 corrects the value of the amplified differential of the differential amplifying section 12 produced by the A/D converter section 18 according to the modification of the reference voltage by the reference voltage control section 13. Then, changes in the shake signal of the apparatus caused by mild drifts are removed by the HPF arithmetic section 17 through HPF arithmetic operations on the basis of the output of said shake signal correcting section 15. Finally, the initial value for and the timing of producing a shake signal from either HPF arithmetic section 17 or said shake signal correcting section 15 are specified by the shake signal output specifying section 16.

The arrangement of the fifth embodiment shown in FIG. 5 basically operates as an improved amplifier for amplifying the output of the shake detecting sensor that operates not to produce a saturated state for the amplified output if drifts are generated in the sensor so that only the component of the signal representing the shake can be extracted in subsequent processing operations through digital HPF arithmetics.

The shake detecting sensor section 11 of any of the above embodiments is designed to detect a shake in terms of acceleration, velocity and position.

Figures 6A, 6B, 6C:
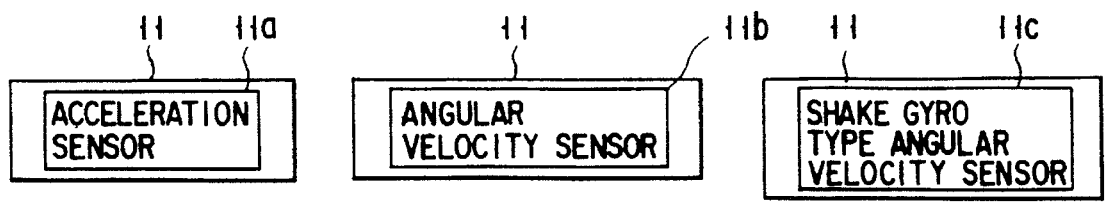
FIGS. 6A through 6C show three different designs of the shake detecting sensor section 11 of a shake detecting apparatus according to the present invention, comprising respectively an acceleration sensor, an angular velocity sensor and a shake gyro type angular velocity sensor.

For instance, FIG. 6A illustrates an acceleration sensor that can be designed in various different ways. For example, a massive weight may be combined with a piezoelectric device so that the inertial force of the weight can be detected by the piezoelectric effect of the device. The weight may alternatively be secured by an electromagnetic actuator and controlled by a servomechanism to determine the acceleration of the weight can be determined by way of the rate of electric energy consumption. The weight may still alternatively be combined with a piezoelectric resistor device and arranged on a semiconductor chip. The weight arranged on the semiconductor chip may be controlled by a servomechanism using an electrostatic actuator so that the acceleration of the weight can be determined by metering the flowing electric charge. When the weight is made rotatable or an arrangement is provided to measure the acceleration of the weight at two spots to find out any difference in the measured values, the sensor may operate as an angular velocity sensor, which is illustrated in FIG. 6B.

A shake may be determined in terms of velocity by connecting the above described shake sensor designed to detect a shake in term of acceleration with an integrator.

The shake detecting sensor section may be realized by arranging a rotary type gyro to determine the angular velocity of a shake from the force required to spatially secure the gyro.

A shake gyro type angular velocity sensor as shown in FIG. 6C may be used for the shake detecting sensor section. The sensor of FIG. 6C is designed to detect the rotary speed (angular velocity) of a supersonically vibrating reed by detecting changes in the shake caused by Coriolis force that is generated as a result of rotary motion of the supersonically vibrating reed energized by means of a piezoelectric or magnetostrictive device. The shake gyro type angular velocity sensor is particularly effective in situations where large thermal drifts are present.

A shake detecting sensor may be designed to detect a shake in terms of positional changes by detecting by optical, electric or magnetic means the displacement of a weight that is spatially secured, utilizing inertia or the gyro effect.

The reference voltage output section 14 produces a reference voltage specified by the reference voltage control section 13.

As shown in FIG. 7, the reference voltage control section 13 connected to the differential amplifying section 12 may comprise a differential amplification reference value referencing section 13a for determining if the output voltage of the differential amplifying section 12 is higher or lower than a predetermined reference value for differential amplification and a differential amplification alteration specifying section 13b for specifying an alteration to the output voltage according to the judgment of the differential amplification reference value referencing section 13a.

As shown in FIG. 8, the differential amplification reference value referencing section 13a and the differential amplification alteration specifying section 13b of the reference voltage control section 13 may be further divided to provide two separate flow routes of information within it.

More specifically, the differential amplification reference value referencing section 13a comprises a first differential amplification reference value referencing section 13a1 for determining if the output voltage of the differential amplifying section 12 is higher or lower than a first predetermined reference value for differential amplification and a second differential amplification reference value referencing section 13a2 for determining if the output voltage of the differential amplifying section 12 is higher or lower than a second predetermined reference value for differential amplification, whereas the reference voltage alteration specifying section 13b comprises a reference voltage upward alteration specifying section 13b1 and a reference voltage downward alteration specifying section 13b2 for respectively specifying an upward voltage alteration and a downward voltage alteration for the reference voltage output section 14 according to their respective judgments.

When the differential amplifying section 12 is designed to operate for non-inversive amplification for the output of the shake detecting sensor section 11, the differential amplification output of the differential amplifying section 12 is expressed by the equation below.

differential amplification output

=differential amplification ratio×(output of shake detecting sensor section 11−reference voltage)

If the first differential amplification reference value referencing section 13a1 of the reference voltage control section 13 determines that the output of the differential amplifying section 12 is smaller than the first predetermined reference value for differential amplification, it assumes that the output of the shake detecting sensor section 11 and that of the differential amplifying section 12 are drifted toward the high voltage side and the risk of saturated may probably be high on the high voltage side. Then, it also assumes that the differential amplification reference voltage is too low for the output of the shake detecting sensor section 11.

If such is the case, the reference voltage control section 13 cause the reference voltage upward alteration specifying section 13b1 to raise the reference voltage to be given to the differential amplifying section 12 from the reference voltage output section 14 by a predetermined reference voltage alteration value. Then, difference (output of shake detecting sensor section 11−reference voltage) is reduced to lower the output of the differential amplifying section 12 by (predetermined reference voltage alteration value×differential amplification ratio of differential amplifying section 12). As a result, the risk of saturation is prevented from taking place in the output of the differential amplifying section 12 on the high voltage side.

When the differential amplifying section 12 is designed to operate for inversive amplification for the output of the shake detecting sensor section 11, the differential amplification output of the differential amplifying section 12 is expressed by the equation below.

differential amplification output

=differential amplification ratio×(reference voltage−output of shake detecting sensor section 11)

If the first differential amplification reference value referencing section 13a1 of the reference voltage control section 13 determines that the output of the differential amplifying section 12 is smaller than the first predetermined reference value for differential amplification, it assumes that the output of the shake detecting sensor section 11 and that of the differential amplifying section 12 are drifted toward the high voltage side and the risk of saturated may probably be high on the high voltage side. Then, it also assumes that the differential amplification reference voltage is too low for the output of the shake detecting sensor section 11.

If such is the case, the reference voltage control section 13 cause the reference voltage upward alteration specifying section 13b1 to lower the reference voltage to be given to the differential amplifying section 12 from the reference voltage output section 14 by a predetermined reference voltage alteration value. Then, difference (reference voltage−output of shake detecting sensor section 11) is reduced to lower the output of the differential amplifying section 12 by (predetermined reference voltage alteration value×differential amplification ratio of differential amplifying section 12). As a result, the risk of saturation is prevented from taking place in the output of the differential amplifying section 12 on the high voltage side.

In this way, regardless of non-inversive amplification or inversive amplification, the differential amplifying section 12, the differential amplifying section 12 operates correctly to avoid saturation from taking place. If differential amplification is carried out with a large amplifying ratio by means of an operational amplifier, the overall circuit configuration will be simplified when it is designed for inversive amplification.

Note that, as shown in FIG. 9, the reference voltage control section 13 may alternatively comprise a reference voltage alteration reference value output section 13c for determining the amount of alteration to be made to the reference voltage according to the judgment of the differential amplification reference value referencing section 13a so that the amount of alteration to be made to the voltage is specified to the reference voltage output section 14 by the reference voltage alteration specifying section 13b.

With the arrangement of FIG. 8, if the reference voltage control section 13 determines that the output of the non-inversive differential amplifying section 12 is smaller than the second predetermined reference value for differential amplification which is smaller than the first predetermined reference value for differential amplification, it assumes that the output of the shake detecting sensor section 11 and that of the differential amplifying section 12 are drifted toward the low voltage side and the risk of saturated may probably be high on the low voltage side. Then, it also assumes that the differential amplification reference voltage is too high for the output of the shake detecting sensor section 11.

If such is the case, the reference voltage given to the differential amplifying section 12 by the reference voltage output section 14 is lowered by a predetermined reference voltage alteration value. Then, the value of (output of shake detecting sensor section 11−reference voltage) is raised and the output of the differential amplifying section 12 is increased by (predetermined reference voltage alteration value×differential amplification ratio of differential amplifying section 12). As a result, the risk of saturation is prevented from taking place in the output of the differential amplifying section 12 on the low voltage side.

In this way, the output of the shake detecting sensor section 11 is protected against saturation after it is amplified if any drifts may appear on the part of the shake detecting sensor section 11.

The unit value of upward or downward alteration to be made by the reference voltage output section 14 to the reference voltage is, as described above, defined by formula (predetermined reference voltage alteration value×differential amplification ratio of differential amplifying section 12). In order for the output of the differential amplifying section 12 not to be saturated, the requirement shown below has to be met.

output range of differential amplifying section
>(predetermined reference voltage alteration value×differential amplification ratio of differential amplifying section 12)

Thus, with the first through fifth possible configurations according to the first embodiment of the invention, the output of the shake detecting sensor section 11 is effectively prevented from becoming inoperative by the phenomenon of saturation due to drifts of signal.

Now, the operation of the first embodiment of the invention will be described by referring to FIG. 10 that illustrates the basic profiles of the output voltage of the shake detecting sensor, the reference voltage and the produced shake signal.

Figure 10:
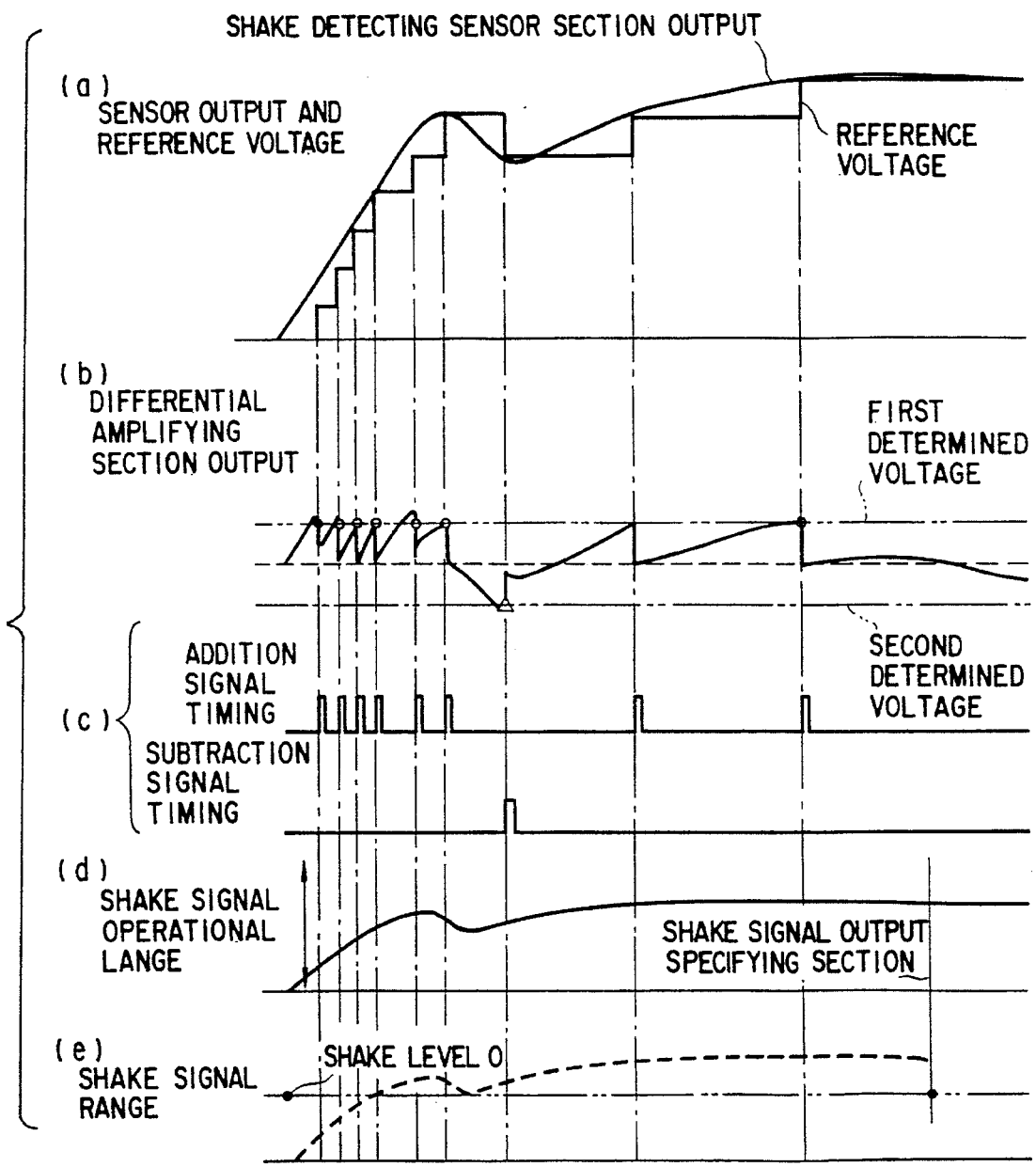
FIG. 10 is a graph illustrating the basic profiles of the signal of the sensor, the reference voltage and the shake signal of the first embodiment.

In FIG. 10, the profile of the output voltage of the shake detecting sensor section 11 and the change with time of the reference voltage are shown in section (a). It is seen that the reference voltage produced by the reference voltage output section 14 under the control of the reference voltage control section 13 follows stepwise the output voltage of the shake detecting sensor section 11 so that the output of the differential amplifying section 12 is always found between the first and second predetermined reference values for differential amplification (limit voltages) supplied by the reference voltage control section 13.

Under this condition, the corresponding output of the differential amplifying section 12 is the product of amplification of the difference between the reference voltage and the output of the shake detecting sensor section 11, which will be typically teeth-shaped as indicated by (b) in FIG. 10. This output signal is generally found between the first and second limit voltages and, if it is deviated beyond the limits, the output of the reference voltage output section 14 shows a sudden change as it is altered by a predetermined value by the reference voltage control section 13.

Note that, in (b) of FIG. 10, the white circles indicates timings at which an addition signal is supplied by the reference voltage control section 13, whereas white triangles indicates timings at which a subtraction signal is given out by the reference voltage control section 13. While the value by which the reference voltage is altered after an operation of differential amplification is equal to a half of the difference between the first and second limit voltages for (a) and (b) of FIG. 10, it only represents a possible value and any other appropriate values may be used for the purpose of the invention.

In FIG. 10, (c) shows timings at which a signal is supplied by the reference voltage control section 13 to alter the reference voltage. Each time the reference voltage output section 14 receives a signal from the reference voltage control section 13, it raises or lowers its output by a predetermined value.

The shake signal correcting section 15 adds or subtracts a value that corresponds to the change in the output of the differential amplifying section 12 that occurs when the reference voltage output section 14 modifies the reference voltage under the control of the reference voltage control section 13 to or from the output signal of the differential amplifying section 12. As a result, if the arithmetic operations carried out for the shake signal in the shake signal correcting section 15 has a large applicable range, the signal shows a profile indicated by (d) in FIG. 10 and obtained by tracing the profile of the output of the shake detecting sensor section 11.

This means that, if the sensor produces an output containing components representing drifts, the embodiment can produce a shake signal that faithfully and effectively tells about the shake it has detected.

Note that the signal profiles of FIG. 10 correspond to the configuration of FIG. 2, according to which, the shake detecting apparatus comprises a shake detecting sensor section 11 for detecting a shake, a differential amplifying section 12 for amplifying the difference between said shake detecting sensor section 11 and a reference voltage, a reference voltage output section 14 for producing a reference voltage, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of said reference voltage by the reference voltage control section 13 and a shake signal output specifying section 16 for specifying the initial value for and the timing of producing a shake signal from the shake signal correcting section 15. Thus, the shake signal output specifying section 16 sets an initial value of shake signal at a predetermined timing in the shake signal correcting section 15.

As shown by (d) and (e) in FIG. 10, the output signal of the shake signal correcting section 15 indicates the exact timing at which the output of the differential amplifying section 12 is judged to be free of shake or in a shake "0" status so that the shake detecting sensor section 11 transmits a signal free of initial instability.

Differently stated, under this condition, the apparatus can amplify the output signal of the shake detecting sensor to a predetermined sensible level without being affected by the initial instability of operation and giving rise to a saturated state to the signal. From this time on, an initial value can be specified for the output of the shake detecting sensor section 11 without saturating the output after an operation of differential amplification if drifts occurs there.

A shake detecting apparatus according to the first embodiment of the present invention may alternatively have a configuration as shown in FIG. 3. With this configuration, the apparatus comprises a shake detecting sensor section 11, a differential amplifying section 12 for amplifying the difference of the output of the shake detecting sensor section 11 and a reference voltage, a reference voltage output section 14 for producing a reference voltage, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of the reference voltage by the reference voltage control section 13 and an HPF arithmetic section 17 for removing changes in the shake signal of the apparatus caused by mild drifts through HPF arithmetic operations on the basis of the output of the shake signal correcting section 15. With the above arrangement, the apparatus operates without saturating the output of the shake detecting sensor after an operation of differential amplification if drifts occurs there and the shake components of the output signal can be extracted by subsequent HPF arithmetic operations.

Since drifts in the output of the sensor due to temperature have a frequency lower than that of a shake caused by hand, they can be removed by using one or more than one HPFs with a cutoff frequency lower than the frequencies of the effective components of a shake by hand that can affect the output signal. If a shake is caused on a still camera, components of the shake having a frequency as low as 1 Hz have to be satisfactorily detected. For such a case, the cut off frequency may well be set to a level equal to or lower than 0.1 Hz.

A shake detecting apparatus according to the first embodiment of the present invention may still alternatively have a configuration as shown in FIG. 4, which is in fact a combination of those of FIGS. 2 and 3. With the above arrangement, the apparatus operates without saturating the output of the shake detecting sensor after an operation of differential amplification if drifts occurs there and the shake components of the output signal can be extracted by subsequent HPF arithmetic operations. As shown in FIG. 4, a shake detecting apparatus with this configuration comprises a shake detecting sensor section 11, a differential amplifying section 12 for amplifying the difference of the output of the shake detecting sensor section 11 and a reference voltage, a reference voltage output section 14 for producing a reference voltage, a reference voltage control section 13 for raising or lowering the reference voltage produced by the reference voltage output section 14 according to the output of the differential amplifying section 12 and referring to a set of predetermined values, a shake signal correcting section 15 for correcting the output of the differential amplifying section 12 according to the modification of the reference voltage by the reference voltage control section 13 and an HPF arithmetic section 17 for removing changes in the shake signal of the apparatus caused by mild drifts through HPF arithmetic operations on the basis of the output of the shake signal correcting section 15 and a shake signal output specifying section 16 for specifying the initial value for and the timing of producing a shake signal from either said HPF arithmetic section 17 or said shake signal correcting section 15.

With the above arrangement, the data to be used for arithmetic operations by the HPF arithmetic section 17 are set to respective initial values according to the shake signal output specifying signal of the shake signal output specifying section 16 so that the apparatus can effectively remove the offset components out of its output signal without being affected by the initial instability of operation and losing necessary and effective components of the output signal of the apparatus.

If a shake signal output specifying signal is not directly given to the HPF arithmetic section 17 with the above arrangement, the HPF arithmetic section 17 can operate properly by making a signal representing a shake "0" status available at a predetermined timing without sending a shake signal to the shake signal correcting section 15 and releasing the restriction by a signal from the shake signal output specifying section 16.

The operational stability of the HPF arithmetic section 17 can be improved and the convergent behavior of the HPF can be promoted in the initial stages of operation by appropriately controlling the HPF. As shown in FIG. 11, the HPF arithmetic section 17 may comprise an HPF time constant control section 17b that executes HPF arithmetics by altering the time constant stepwise from small to large values during a predetermined time period after the start of arithmetic operations and an HPF arithmetic section 17a that executes HPF arithmetics on the basis of the time constant specified by the HPF time constant control section 17b.

A small time constant is specified to accelerate the convergence of the HPF in the initial stages of HPF arithmetic operations that are triggered by energizing the circuit or initiated by the shake signal output specifying section 16 so that consequently the offset components of the shake signal are quickly removed. With this arrangement, however, the low frequency components of the shake signal are also removed. Additionally, the shake signal can come to show a large error if a small time constant is used because the HPF has to be phasically rotated to a large extent. In order to get rid of these problems, the time constant is modified to show a larger value with time. Thus, after a predetermined period of time, distortions in the shake signal due to an insufficient time constant, or unnecessary removal of necessary and effective low frequency components of the shake signal, and the phasic rotation are effectively avoided. A method as disclosed in Japanese Patent Application KOKAI Publication No. 63-50729 can be used for modifying the time constant of an HPF.

In order for the shake signal not to contain components representing the unstable state of the sensor in the initial stages of operation, the characteristic behavior of the sensor and the differential amplification circuit has to be taken into consideration for formulating the shake signal output specifying signal of the shake signal output specifying section 16. Once the time period required for the sensor and the differential amplification circuit to stabilize is determined, it is compared with the elapsed time since the start of energizing at least one of the shake detecting sensor section 11, the differential amplifying section 12, the reference voltage output section 14 and the reference voltage control section 13 for the operation of detecting a shake and, when the determined time period is over, the differential amplification signal from the differential amplifying section 12 is assumed to be already stabilized so that, at this moment, the shake signal output specifying signal of the shake signal output specifying section 16 is actually sent out to start the operation of the shake signal correcting section 15 and the HPF arithmetic section 17.

If a large drift component is present in the shake signal, the reference voltage produced by the reference volt age output section 14 is frequently altered by the reference voltage control section 13 in order to avoid saturation in the output of the differential amplifying section 12. Then, the apparatus may be so arranged that the stability of the shake signal sent out of the differential amplifying section 12 is determined from the frequency of alteration of the reference voltage and the shake signal output specifying section 16 is made to send out a shake signal output specifying signal to initiate the operation of the shake signal correcting section 15 and the HPF arithmetic section 17 as soon as the stability of the shake signal is acknowledged.

In a situation where the power source is frequently turned on and off with intervals of several seconds to several minutes, substantially identical offset components may become contained each time in the shake signal because the ambient temperature of the shake detecting apparatus may not change significantly.

In such a case, the apparatus may be so arranged that the shake signal produced by the differential amplifying section 12 is determined to have stabilized when the output of the reference voltage output section 14 gets to the level of the reference voltage of the section when the output signal of the differential amplifying section 12 was stabilized in the previous operation and the shake signal output specifying section 16 is made to send out a shake signal output specifying signal to initiate the operation of the shake signal correcting section 15 and the HPF arithmetic section 17 as soon as the stability of the shake signal is acknowledged.

A shake detecting apparatus according to the first embodiment of the present invention may still alternatively have a configuration as shown in FIG. 5. With the above arrangement, the apparatus operates without saturating the output of the shake detecting sensor after an operation of differential amplification if drifts occurs there and the shake components of the output signal can be extracted by subsequent HPF arithmetic operations. As shown in FIG. 5, a shake detecting apparatus with this configuration comprises a shake detecting sensor section 11, a differential amplifying section 12 for amplifying the difference of the output of the shake detecting sensor section 11 and a reference voltage, an A/D converter section 18 for converting the output of the differential amplifying section 12 into a digital signal, a reference voltage output section 14 for producing a reference voltage, a reference voltage control section 13 for raising or lowering the reference voltage produced by the reference voltage output section 14 according to the output of at least either the differential amplifying section 12 or the A/D converter section 18, a shake signal correcting section 15 for correcting the value of the amplified differential of the differential amplifying section 12 produced by the A/D converter section 18 according to the modification of the reference voltage by the reference voltage control section 13, an HPF arithmetic section 17 for removing changes in the shake signal of the apparatus caused by mild drifts through HPF arithmetic operations on the basis of the output of the shake signal correcting section 15 and a shake signal output specifying section 16 for specifying the initial value for and the timing of producing a shake signal from either said HPF arithmetic section 17 or said shake signal correcting section 15.

The use of an A/D converter section 18 for digitizing and digitally processing the shake signal brings forth several advantages.

Firstly, by processing the shake signal digitized by the A/D converter section 18 in the shake signal correcting section 15 and the HPF arithmetic section 17, the range of arithmetic operations can be expanded easily. More specifically, when an analog voltage is processed, it is difficult to deal with a signal that exceeds the voltage of the power source of the analog processing circuit to be used for the processing. If, however, the voltage is digitized, the range of the data representing the voltage can be easily expanded by increasing the number of digits that the registers and the memories of the circuits have for data storage.

Assume for example, A/D conversion is carried out on a 8-bit basis and the subsequent processing operations are carried out on a 16-bit basis. Then, 256 times as many data can be dealt in the digital form. Therefore, if the quantizing level of the A/D converter is made to correspond to a very low shake level, a large detection range can be set for the detection of the shake signal without using a sophisticatedly designed A/D converter section 18.

The operation of specifying an initial value or an output value for the shake signal correcting section 15 and the HPF arithmetic section 17 can be carried out simply by modifying or specifying a value for the registers of the circuit.

HPF arithmetic operations that are carried out by digital processing means such as programs do not require the use circuit devices such as resistors and capacitors that are necessary components of analog circuits. This advantage is particularly remarkable if compared with the case where analog circuits comprising large devices are used for an HPF having a low cutoff frequency.

With a digitized shake signal, data required for the shake signal correcting section 15 to correct the output of the differential amplifying section 12 can be stored in memories such as ROMs and RAMs to facilitate the processing operation. The operation of regulating the apparatus can be carried out with ease on the factory floor for manufacturing the apparatus particularly if rewritable non-volatile memories such as EEPROMs are used.

Additionally, for modifying the time constant used for HPF arithmetics, the contents of the registers storing the data on the time constant can easily be altered by using a circuit having a simple configuration. Not only the time constant but also the gain can be controlled by means of a same and identical circuit configuration if appropriately selected coefficients are used with the outcome of the arithmetic operations. Still additionally, the reference voltage control section 13 and the shake signal output specifying section 16 can be realized in the form of programs for processing digital signals.

When the entire operation of a shake detecting apparatus according to the invention or that of an image shooting apparatus to which a shake detecting apparatus is installed is digitally controlled, the apparatus can be remarkably simplified as the shake signal correcting section 15 and the HPF arithmetic section 17 are digitally operated.

The operation of the reference voltage output section 14 can be also digitized by using an A/D converter. If such is the case, only the shake detecting sensor section 11 and the differential amplifying section 12 of a shake detecting apparatus according to the invention need to be operated in analog mode so that the number of circuit devices can be minimized to astonishingly simplify the overall configuration.

As HPF arithmetic operations are executed after the shake signal is digitized by the A/D converter section 18, the operation of regulating the null voltage required to match the HPF arithmetic operations with required digital processing operations can be omitted and the problem of offset and drift components generated in the differential amplification circuit can be eliminated.

The shake detecting sensor section 11 may comprise only a sensor or alternatively it may comprise a shake detecting sensor and a shake detecting sensor output amplifying section in order to amplify the output of the sensor to a predetermined level before it is sent to the differential amplifying section.

Now, the second embodiment of shake detecting apparatus according to the present invention will be described in greater detail.

FIG. 12 is a block diagram of a principal portion of the second embodiment of shake detecting apparatus according to the invention.

In FIG. 12, the output of shake gyro type angular velocity sensor 19 of the shake detecting sensor section 11 is connected to the inversive input terminal of operational amplifier 20 of the differential amplifying section 12. On the other hand, D/A converter 21 of the reference voltage output section 14 is connected to the non-inversive input terminal of the operational amplifier 20. Thus, the differential amplifying section 12 inversively amplifies the output of the shake detecting sensor section 11.

The output of the operational amplifier 20 is connected to A/D converter 22 of the A/D converter section 18 and the digitized signal from the A/D converter section 18 is sent to shake signal correcting section 24, reference voltage control section 25 and HPF arithmetic section 26 of CPU 23. The HPF arithmetic section 26 is connected to shake signal output specifying section 28 of sequence control section 27.

The shake signal correcting section 24, the reference voltage control section 25, the HPF arithmetic section 26, the sequence control section 27 and the shake signal output specifying section 28 are program means operated by the CPU 23.

Assume here that the sensitivity of the shake gyro type angular velocity sensor 19 is 0.001 [v/(deg/sec)] as expressed in terms of the angular velocity per second.

Assume also that the A/D converter 22 quantizes the potential range between 0 V and 5 V with a resolution having an accuracy of 10-bit and the required resolution is [0.01 deg/sec]. with this arrangement, an angular velocity of up to 0.01×1023=10.23 [deg/sec] is detected for the potential range of 0 V and 5 V for the A/D converter 22. Then, the output is 0.002046 [deg/sec] per 1 mV or 488.8 mV per 1 [deg/sec] and therefore an amplifying ratio β of 488.6 is required for the operational amplifier 20.

In order for the operational amplifier to be controlled to produce its output with 2.5 V±0.833 V (or a potential range of 1.67 V (⅓ of 5 V)), it has to be so designed as to change its output by 1.67 V responding to a single alteration in the reference voltage, assuming that the first and second differential amplification reference values of the reference voltage control section 25 are 3.33 V and 1.67 V respectively. Then, for the reference voltage control section 25 to determine the output of the A/D converter 22, the first and second differential amplification reference value will be 682 LBS and 341 LBS (least significant bit) which is 341 times greater than the smallest unit.

With this arrangement, when the digital value of the input to the D/A converter 21 is changed by "1", its output will change by 0.003418 V, which will become equal to 1.67 V after differential amplification.

The change of 1.67 V in the output of the operational amplifier 20 for a single alteration in the reference voltage correspond to 241 LBS in terms of quantizing level of the A/D converter 22. In other words, the shake signal correcting section 24 modifies the output of the A/D converter 22 when the current reference voltage is altered by the reference voltage control section 25. This value will be expressed by Δx hereinafter.

The shake signal quantized by the A/D converter 22 is processed by using HPF arithmetics and then the reference voltage control section 25 determines from the HPF arithmetic operations if an upward or downward alteration is required for the reference voltage. If yes, the reference voltage is altered by way of the D/A converter 21. Thereafter, the shake signal is corrected by the shake signal correcting section 24.

The HPF arithmetic operations to be carried out by the HPF arithmetic section 26 are as follow. Firstly, the variation in the shake signal is added to the result of the last HPF arithmetic operations multiplied by a coefficient smaller than 1 to remove the low frequency component of the signal. If the outcome of the HPF arithmetic operations is $H_0$, the coefficient for the HPF is $K_H$, the last input shake signal is $x_1$ and the current input shake signal is $x_0$, then $H_0$ is determined by recurrent formula (1) below.

$$H_0 = x_0 - x_1 + (K_H \cdot H_0) \quad (1)$$

where the first $H_0$ found in front of the equal sign is the outcome of the current HPF arithmetic operations and the second $H_0$ is the outcome of the last HPF arithmetic operations.

If the output of the operational amplifier 20 is higher than 3.33 V, the shake signal produced by the A/D converter 22 shows a value greater than 682 LBS as described above. In this case, the reference voltage has to be raised to reduce the value of the shake signal. When the reference voltage for differential amplification applied by the D/A converter 21 to the non-inversive input terminal of the operational amplifier 20 is lowered by a step of D/A conversion, the output of the operational amplifier 20 is reduced by 1.67 V as described above. This is reflected in the next operation of detecting the shake signal by the A/D converter 22.

Thus, in the next HPF arithmetic operations, the value $x_0'$ obtained as a result of A/D conversion will be 1.67 V less than the value that would be obtained if the reference voltage had not been altered. In other words, if no shake signals is detected, the value obtained as a result of A/D conversion in the last HPF arithmetic operations which should be equal the outcome of the current A/D conversion and is to be used for the next HPF arithmetic operations will actually be 1.67 V less than the outcome of the current A/D conversion to give rise to an error. Therefore, the outcome of the last A/D conversion which should be equal to that of the current A/D conversion is reduced by 1.67 V for correction. In other words, the output $H_0'$ of the next HPF arithmetic operations is obtained from the output $H_0$ of the current HPF arithmetic operations, the outcome of the current A/D conversion and the correction Δx for A/D conversion by using the equation below.

$$H_0' = x_0'(x_0 - \Delta x) + (K_H \cdot H_0) \quad (2)$$

Thus, the difference to be produced between the outcome of the current A/D conversion and that of the next A/D conversion due to an alteration in the reference voltage is canceled to accurately carry out HPF arithmetic operations.

In short, the shake signal correcting section 24 operates to correct the outcome of A/D conversion in response to alternation in the reference voltage by the reference voltage control section.

The arithmetic operations by the HPF arithmetic section 26 are controlled by the shake signal output specifying section 28 not to carry out arithmetic operations and send out outputs in a short period immediately after the start of the operation of the shake detecting apparatus in order to appropriately neglect abrupt variations that may occur in the shake signal. Thus, the HPF arithmetic section 26 starts carrying out operations and sending out outputs at a moment specified for the transmission of a shake signal from a "0" status for HPF data $H_0$ or a reset condition as the HPF data is held to the "0" status until that moment. Of course, the HPF arithmetic operations may alternatively be started from some other initial status by storing an appropriate value in the register for $H_0$ and entering that value into the graph used for the operations to take advantage of a digital HPF.

Figure 13:
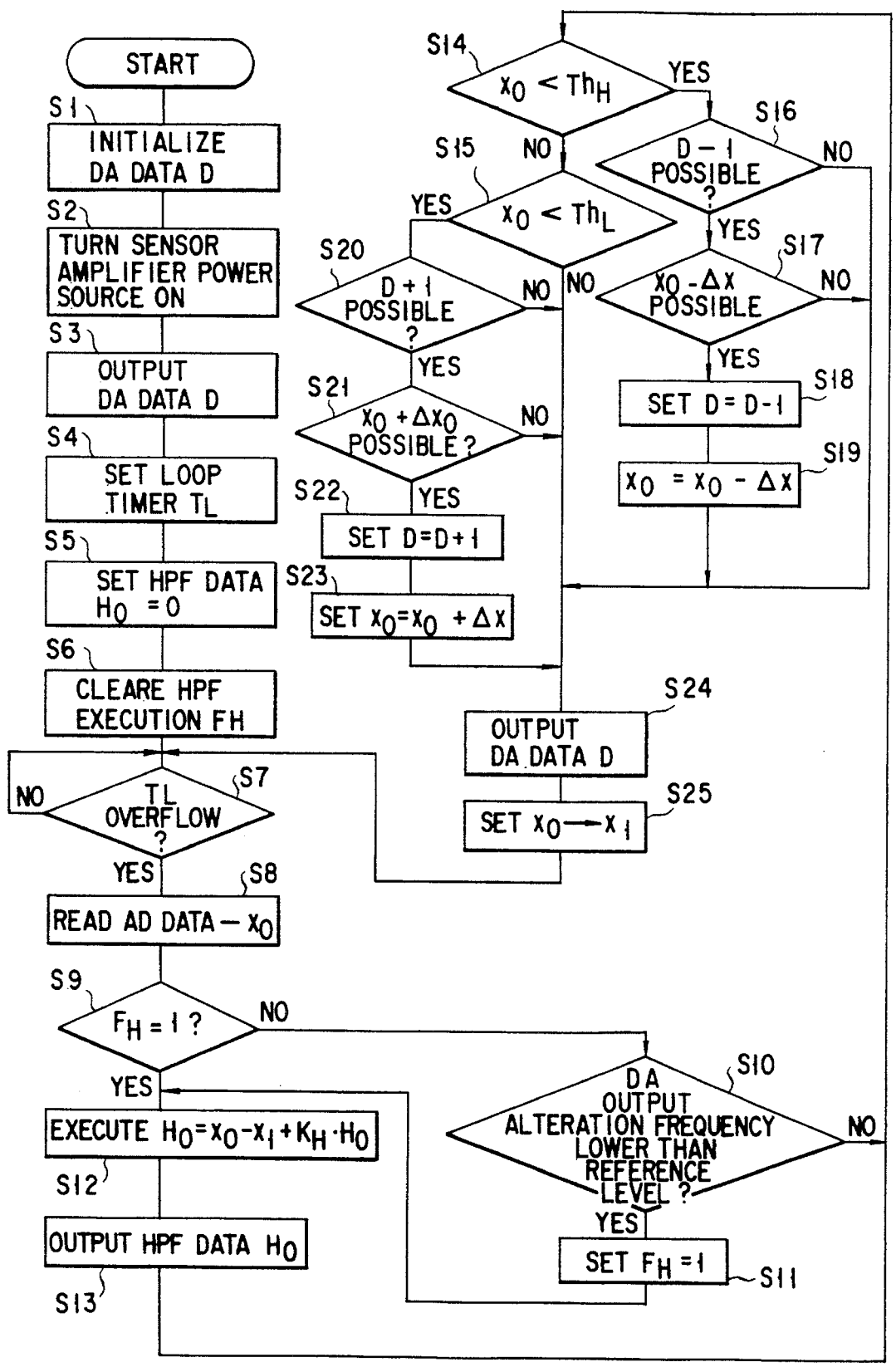
FIG. 13 is a flow chart of the operation of the shake detecting apparatus of FIG. 12.

Now, the operation of the shake detecting apparatus of FIG. 12 will be described by referring to the flow chart of FIG. 13.

To begin with, the CPU 23 starts operating and initializes DA data (D) to be transmitted from the reference voltage control section 25 to D/A converter 21 in step S1. There may be several options for initialization. 0 or the median of the variable range may be used or alternatively the value used for the last stabilizing operation may be used again.

Then, in step S2, the CPU 23 causes the shake gyro type angular velocity sensor 19, the operational amplifier 20, the A/D converter 22 and the D/A converter 21 to be energized. Alternatively they may be energized simultaneously with the CPU 23. Subsequently in step S3, the CPU 23 sends the DA data (D) to the D/A converter 21 to make the D/A converter 21 apply a reference voltage to the operational amplifier 20.

Thereafter, in step S4, the CPU 23 sets up a loop timer ($T_L$) that generates a signal representing a timer overflow condition with a predetermined time interval in order for the shake signal to be processed periodically. This operation will be simplified if an automatic reload type timer is used for the loop timer. Thereafter, a $T_L$ overload flag will be set each time when a predetermined time period has elapsed. This time period is preferably between several hundreds micro seconds to about 1 millisecond in order to realize high speed feedback and accurately control of the reference voltage, taking the speed for A/D and D/A conversions into consideration. Note that the loop starts operating from step S7 as will be described hereinafter.

In step S5, the CPU 23 initializes HPF data ($H_0$). In the currently discussed case, it is reset to 0. In step S6, the CPU 23 clears HPF execution flag ($F_H$) which is to be set for HPF arithmetic operations in the loop.

Then, the CPU 23 start operating for the loop for arithmetics and processing in step S7.

Firstly in step S7, the CPU 23 checks the loop timer $T_L$ for overflow and repeats this checking action until the automatic reload type timer actually overflows. Once the CPU 23 acknowledges that the loop timer $T_L$ overflows and a predetermined time period has elapsed, it proceeds to step S8, where it reads data $x_0$ from the A/D converter 22 and stores it in a register as the shake signal obtained as a result of differential amplification.

Then, in step S9, the CPU 23 checks if HPF execution flag $F_H$ is set or HPF arithmetic operations are ready for executed. If yes, the CPU 23 proceeds to step S12 to execute the HPF arithmetic operations. If the HPF arithmetic operations are not ready for execution, it indicates that flag $F_H$ is in a reset state and therefore the CPU 23 proceeds to step S10.

In step S10, the CPU 23 checks the frequency with which the D/A conversion output data it specifies to the D/A converter 21 is modified. Here, the CPU 23 sets up a loop counter to find out how may times the steps S14 through S24 have been executed without altering the DA data and, if the reading of the counter successively exceeds a predetermined number of times, it determines that the frequency undergoes a predetermined value. If the frequency exceeds the predetermined value, the CPU 23 determines that the output of the sensor has not stabilized and proceeds to step S14 to control the reference voltage without carrying out the HPF arithmetic operations. If the frequency of modification in the reference voltage is found to be lower than the predetermined value, the CPU 23 determines that the output of the shake gyro type angular velocity sensor 19 has gone through the initial unstable period after the start of operation and already in a stabilized state and so it proceeds to step S11 to set up HPF execution flag $F_H$ before it moves to step S12.

In step S12, the CPU 23 execute HPF arithmetic operations, using the above formulas to produce the result $H_0$ of the current HPF arithmetic operations, using the current A/D conversion data $x_0$, the last A/D conversion data $x_1$, the result $H_0$ of the last HPF arithmetic operations and coefficient $K_H$ for the HPF time constant. If the execution of the HPF arithmetic operations has just started, the value of $H_0$ initialized before entering the loop from step S7 is used for the result $H_0$ of the last HPF arithmetic operations.

After the execution of the HPF arithmetic operations in step S12, the CPU 23 proceeds to step S13, where it sends out, if necessary, HPF data $H_0$ as a result of the HPF arithmetic operations, and then moves to step S14.

In step S14, the CPU 23 compares AD data $x_0$ as the output of the A/D converter 22 with the first differential amplification reference value $Th_H$. If the AD data $x_0$ is greater than $Th_H$, the CPU 23 moves to step S16 to lower the reference voltage of the D/A converter 21 in order to avoid saturation in the output of the operational amplifier 20. If, to the contrary, $x_0$ is smaller than $Th_H$, the CPU 23 goes to step S15.

In step S15, the CPU 23 compares AD data $x_0$ as the output of the A/D converter 22 with the second differential amplification reference value $Th_L$. If the AD data $x_0$ is smaller than $Th_L$, the CPU 23 moves to step S20 to raise the reference voltage of the D/A converter 21 in order to avoid saturation at the lower limit of the output of the operational amplifier 20. If, to the contrary, $x_0$ is greater than $Th_L$, the CPU 23 proceeds to step S24.

After moving to step S16 to lower the reference voltage, the CPU 23 firstly checks if DA data D to be specified to the D/A converter 21 affords any decrement. This is designed to avoid alteration in the reference voltage if D is equal to 0 because DA data D cannot be made smaller than the lowest possible value for the register for storing the data. Additionally, with this arrangement, a situation where D falls under a value that is interlocked with the output of the D/A converter 21 is avoided if D is greater than 0 and can take such a value.

In step S16, if it is found that the D does not afford any decrement, the CPU 23 stops trying to alter the reference voltage and proceeds to step S24. On the other hand, if it is found by the CPU 23 that D affords a decrement, it goes to step S17, where it determines the AD data can be corrected if the reference voltage is altered. More specifically, it executes a subtraction according to the formula below $$x_0 = x_0 - \Delta x \quad (3)$$

(where $\Delta x$ is the output of the differential amplifier corresponding to the alteration in the reference voltage) to see if the difference obtained by the above subtraction does not exceeds the capacity of the register for storing $x_0$ if $x_0$ is corrected.

If, in step S17, the CPU 23 determines that the above difference exceeds the capacity of the register, no normal correction can be carried out probably because of an abnormal condition and, therefore, the CPU 23 proceeds to step S24. If, on the other hand, the AD data $x_0$ can be corrected, the CPU 23 moves to step S18, where it decrements the DA data D to be sent to the D/A converter 21, and then to step S19 to correct the AD data $x_0$ according to the decremented DA data D before it proceeds to step S24.

If the CPU 23 proceeds to step S20 to raise the reference voltage as a result of its operation in step S15, it firstly check if the DA data D to be specified to the D/A converter 21 can be incremented. This is to find out if the DA data D cannot be increased beyond the maximum value that the register for the data can store, which will be 255 for instance. If such is the case and D is equal to or greater than 255, the CPU 23 does not change the reference voltage. Additionally, with this arrangement, a situation where D exceeds a value that is interlocked with the output of the D/A converter 21 is avoided if D is smaller than 255 and can take such a value.

If it is found by the CPU 23 that D cannot be incremented in step S20, it suspends its effort of altering the reference voltage and proceeds to step S24. If, on the other hand, it is found that D can be incremented, the CPU 23 goes to step S21, where it determines if the AD data can be corrected when the reference voltage is modified. More specifically, it executes an addition according to the formula below $$x_0 = x_0 + \Delta x \quad (4)$$

(where $\Delta x$ is the output of the differential amplifier corresponding to the alteration in the reference voltage) to see if the sum obtained by the above subtraction does not exceeds the capacity of the register for storing $x_0$ if $x_0$ is corrected.

If, in step S21, the CPU 23 determines that the above sum exceeds the capacity of the register, no normal correction can be carried out probably because of an abnormal condition and, therefore, the CPU 23 proceeds to step S24. If, on the other hand, the AD data $x_0$ can be corrected, the CPU 23 moves to step S22, where it increments the DA data D to be sent to the D/A converter 21, and then to step S23 to correct the AD data $x_0$ according to the incremented DA data D before it proceeds to step S24.

In step S24, the CPU 23 sends the DA data D to D/A converter 21. Subsequently, the CPU 23 stores the AD data $x_0$ in the register as the next AD data $x_1$ for the next HPF arithmetic operations. Thereafter, the CPU 23 moves to step S7 to repeat the above actions.

In this way, the drift and offset components in the output of the shake gyro type angular velocity sensor 19 are removed by means of the operational amplifier 20, the D/A converter 21, the A/D converter 22 and the shake signal correcting section 24, the reference voltage control section 25 and the HPF arithmetic section 26 in the CPU 23.

Now, the third embodiment of shake detecting apparatus according to the invention will be described in greater detail. This embodiment is a shaken image restoring apparatus designed to restore a degraded image produced as a result of a shake.

The shaken image restoring apparatus comprises a known apparatus designed be installed in an image forming or shooting apparatus such as camera to detect a shake in terms of horizontal (along X-axis) and vertical (along Y-axis) directions and move part of the optical system in order to stabilize the image on the film.

The basic arrangement for detecting a shake for a camera is similar to that of the second embodiment illustrated in FIG. 12 and utilizing X- and Y-axes. Therefore, it will not be illustrated by additional drawings.

The basic operation of the camera provided with the embodiment will be described by referring to FIG. 14.

Firstly in step S31, the brightness of the target is measured to properly control the aperture of the iris diaphragm and the shutter speed so as to meet the required exposure obtained by the measurement by means of known apex arithmetics. Then, in step S32, the controlled exposure value is displayed on the display mounted in the finder of the camera.

Thereafter, in step S33, it is determined if the first release switch (1st Rel Sw) is operated by the camera operator to initiate an automatic focusing operation for focusing on the target. If not, the CPU 23 returns to step S31. If, on the other hand, the first release switch is operated, the CPU 23 goes to step S34, where automatic focusing is carried to focus on the target by means of the automatic focusing device of the camera.

Then, in step S35, it is determined if the second release switch (2nd Rel Sw) is operated by the camera operator to give an instruction for exposure to the camera. If not, the CPU 23 returns to step S31. If, on the other hand, it is found in step S35 that the second release switch is operated, the exposure routine is executed in step S36.

After the end of the exposure routine, in step S37, a series of after-exposure processing operations including positional initialization of the optical system of the shaken image restoring apparatus, recharging of the shutter, resetting of the iris diaphragm and, if the camera is a single lens reflex camera, resetting of the quick return mirror are carried out. Then, in step S38, the film is advanced for another exposure and the CPU 23 returns to step S31.

In the exposure routine of step S36, the shake detection sensor and the circuit are energized to detect a shake whenever it happens and restore the shaken image, while a mirror-up operation to move the quick turn mirror out of the light path for photographing, an operation for driving the iris diaphragm and the shutter device in accordance with the calculated values for the aperture of the iris diaphragm and the shutter speed and other operations are carried out in an orderly manner.

Figure 15:
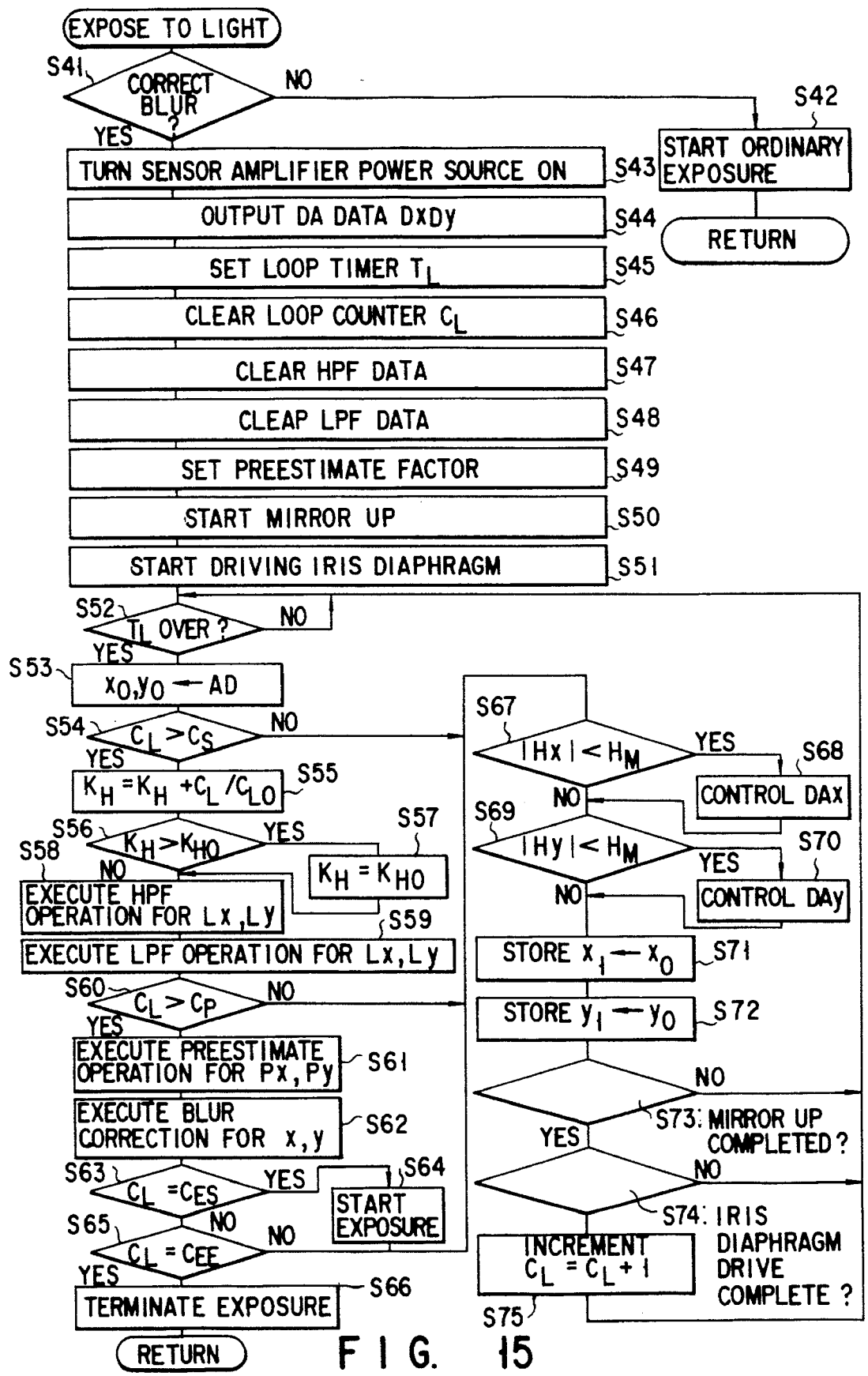
FIG. 15 is a flow chart of an exposure routine that can be used for the operation of FIG. 14.
Figure 18:
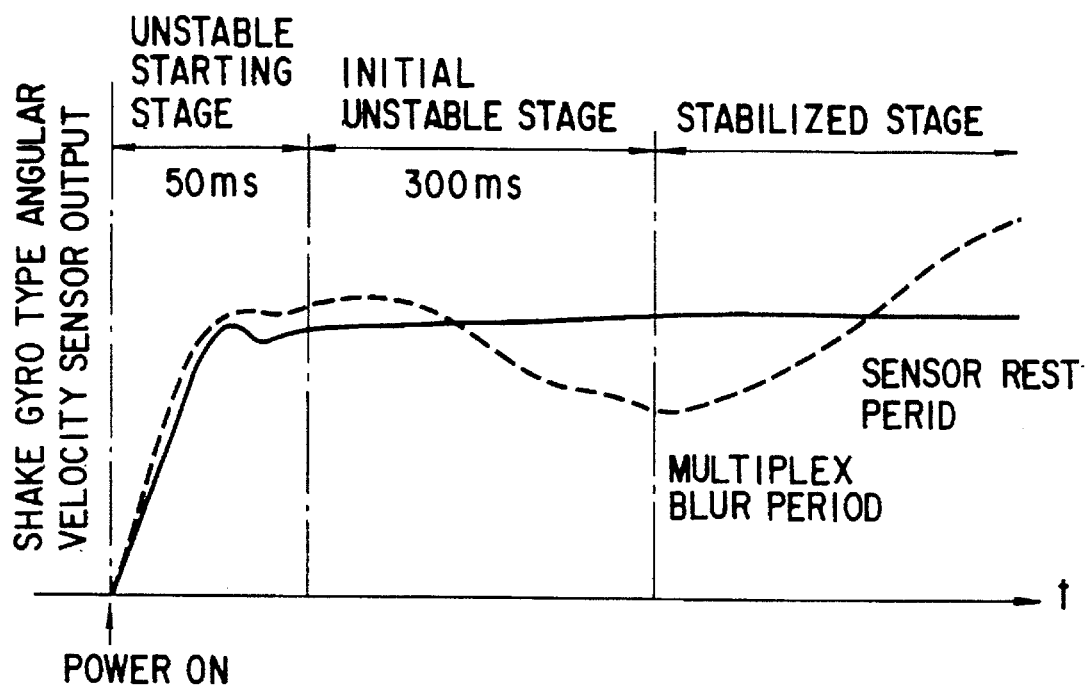
FIG. 18 is a schematic illustration of changes with time that can take place in the output signal of a known shake gyro type angular velocity sensor in the initial stages of activation.
Figure 19:
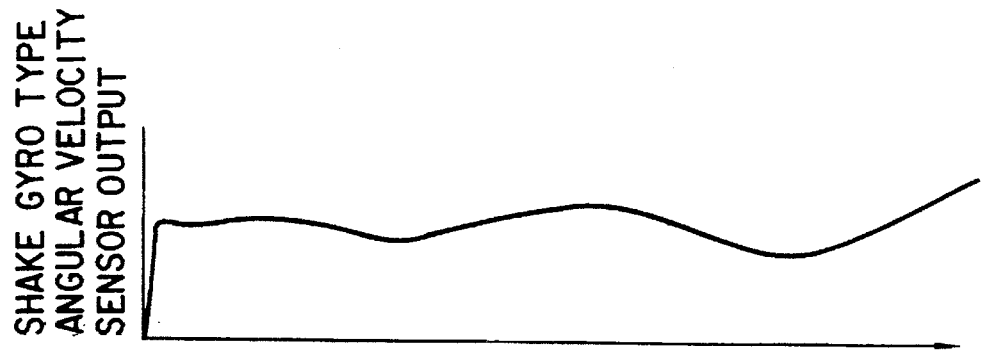
FIG. 19 is a schematic illustration of changes with time observed in a longer perspective on the output signal of a known shake gyro type angular velocity sensor.
Figure 20:
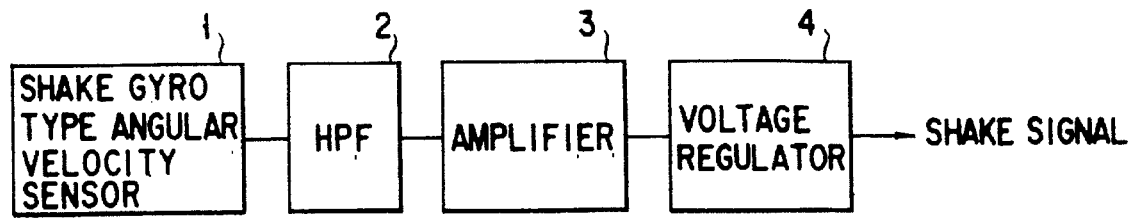
FIG. 20 is a block diagram of a typical known arrangement for detecting a shake comprising a shake gyro type angular velocity sensor.
Figure 21:
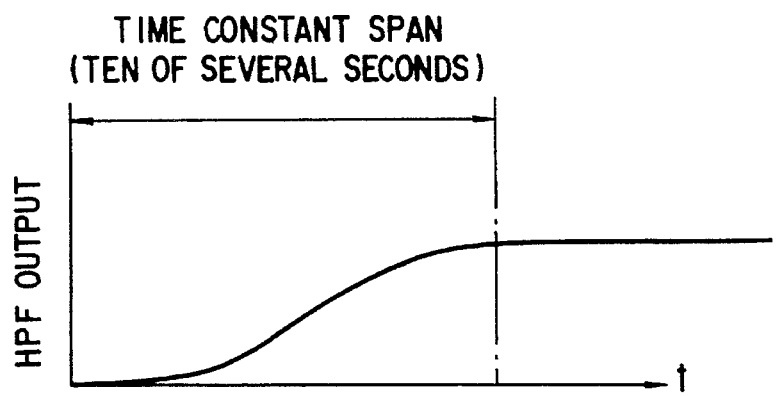
FIG. 21 is a graph showing the relationship between the elapsed time after the start of operation of the arrangement of FIG. 20 and the output level of the HPF.
Figure 22:
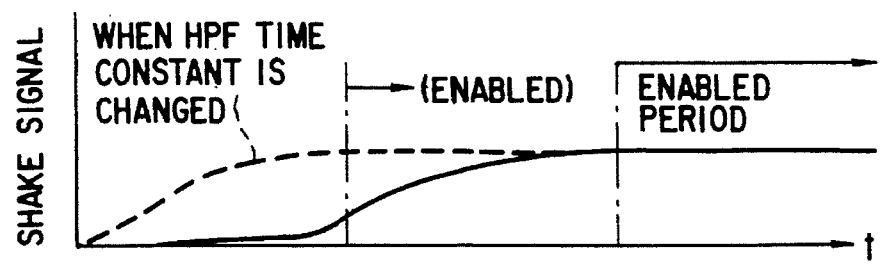
FIG. 22 is a graph similar to FIG. 21 but showing the profile of a shake signal after the start of operation of an arrangement comprising a plurality of integrators provided with respective HPFs having different time constants.

FIG. 15 shows a flow chart for the exposure routine. Now the operation of the above embodiment will be described by referring to the flow chart.

Firstly, in step S41, it is determined if an operation of restoring a shaken image is necessary on the basis of the current status of the shake image restoration mode, the relationship between the exposure time and the focal distance and other factors. This is done because, the use of the shaken image restoring apparatus may be required at the cost of consuming unnecessary power particularly if a wide angle lens is used with a high shutter speed. If it is determined that such an operation is not necessary, the exposure routine is executed normally in step S42 and the CPU 23 returns to the normal course. If, on the other hand, if it is determined that a shaken image restoring operation is necessary, the CPU 23 moves to step S43.

In step S43, the CPU 23 causes the sensors and amplifiers for detecting a shake along the X- and Y-axes including the shake gyro type angular velocity sensor 19, the operational amplifier 20, the D/A converter 21, the A/D converter 22 to be energized. Then, in step S44, the CPU 23 sends output data $D_x$ and $D_y$ respectively to the D/A converters 21 for the X- and Y-axes. As a result, the D/A converters 21 produces respective reference voltages to the two operational amplifiers 20.

Then, in step S45, the CPU 23 sets the loop timer $T_L$ for generating a period for periodically detecting a shake signal and executing related arithmetic operations. This is an automatic reload type timer that transmits an overflow signal with a predetermined interval and sets a flag. Then, in step S46, the CPU 23 clears the loop counter CL for counting the number of times of executing the loop. This is a counter that is incremented each time when the loop is executed. The counter is also incremented when a mirror-up operation or an operation of driving the iris diaphragm is over.

In step S47, the CPU 23 initializes the HPF data register for HPF arithmetics to be executed to remove the offset and drift components of the shake signal. More specifically, the $H_x$ and $H_y$ registers for storing the outcome of the HPF arithmetic operations are cleared and the time constant of the HPF is initialized by using an HPF coefficient $K_H$. The value to be selected for $K_H$ for initialization is preferably a cutoff frequency of about 10 Hz in view of the convergency immediately after the start of HPF arithmetic operations.

Thereafter, in step S48, the LPF register for storing the outcome of LPF arithmetic operations to be executed to remove high frequency noises is also cleared. In step S49, a prediction coefficient to be used for arithmetic operations for the purpose of prediction of possible alterations in the shake signal is also set so that a corrected shake signal may be generated to accommodate any delay in the response of the sensor and the shaken image restoring means. A shake signal to be generated in the future can be easily predicted by the method which is disclosed in, for example, Jpn. Pat. Appln. KOKAI Publication No. 5-204013 corresponding to a Japanese Patent Application filed by the assignee of the present invention and in which the data items acquired in the past are first weighted and then added together. For this purpose, the CPU 23 retrieves appropriate data from the stored past data concerning LPF arithmetic operations and uses equation $P_x = \Sigma a_1 \cdot L_{xi}$, where $a_1$ is a weight coefficient, $L_x$ is the output of the LPF and i is a value correspond to a row of time-serially arranged data.

In step S50, the CPU 23 starts the operation of mirror-up to move the quick turn mirror out of the light path prior to exposure. Then, in step S51, the CPU 23 drives the iris diaphragm to show a predetermined aperture.

In step S52, the CPU 23 checks if an overflow condition exists in the loop timer $T_L$ for periodical operations until such a condition is detected. Upon detecting an overflow condition in step S52, the CPU 23 proceeds to step S53.

In step S53, the CPU 23 reads out digitized data on a shake detected by the shake gyro type angular velocity sensor 19 by means of the A/D converters 22 for the x- and Y-axes from the respective operational amplifiers 20 and stores them in registers $x_0$ and $y_0$ respectively. Thereafter, in step S54, the CPU 23 determines the time that has elapses for the routine exceeds the time good for HPF arithmetic operations or not by checking if the count data $C_s$ for the start of arithmetic operations is greater than the reading of the loop counter $C_L$. This is done to determine if the time that has passed after the start of operation of the sensor is good enough for HPF arithmetic operations and eliminate a situation where an unstable shake signal is given to the HPF before a sufficient time has elapsed since the start of operation of the sensor.

In the above step S54, if the reading of the loop counter $C_L$ is not greater than the count data $C_S$ for the start of arithmetic operations, the CPU 23 moves to step S67, whereas if the reading of $C_L$ is greater than $C_S$, it goes to step S55, where it increments the coefficient $K_H$ for the HPF time coefficient in order to gradually lower the cutoff frequency until it gets to a level of about 0.1 Hz. For this purpose, the CPU 23 executes the operation of the following formula.

$$K_H = K_H + (C_L/C_{L0}) \quad (5)$$

where $C_{L0}$ is a constant selected in such a way that the value of $K_H$ gets to $K_{H0}$ for a cutoff frequency of about 0.1 Hz within several hundreds milliseconds after the start of HPF arithmetic operations.

Note that the above equation (5) is used for the equation (1) cited above to determine the outcome of HPF arithmetic operations.

In this way, by setting an HPF time constant that depends on the number of times of passing through the loop, the performance of the HPF can be finely and appropriately controlled.

If it is found in step S56 that $K_H$ eventually goes beyond a threshold value $H_0$ for the designed cutoff frequency, the CPU 23 moves to step S57, where $K_H$ is corrected to $H_0$. Then, the CPU 23 moves to step S58 and execute HPF arithmetic operations to obtain HPF data $H_x$ and $H_y$.

Thereafter, in step S59, the CPU 23 carries out LPF (low pass filter) arithmetic operations in order to remove high frequency noises. More specifically, the recurrent equation shown below is used assuming that the outcome of the current LPF arithmetic operations is $L_0$ and the outcome of the last LPF arithmetic operations is $L_1$, the input value being $H_0$ or the outcome of the last HPF arithmetic operations.

$$L_0 = K_L \cdot H_0 + (1 - K_L) \cdot L_1 \quad (6)$$

where $K_H$ represents a coefficient having value between 0 and 1 that reflects the past data for producing favorable effects if it is small for the low pass filter. For comparing the value of $K_L$ with the time constant of the high pass filter obtained by analog CR coupling, the equation below can be obtained from the differential equation for an analog CR filter, assuming that the cutoff frequency of the filter is fL and the interval between two successive arithmetic operations is $\Delta x$ (which is equal to 500 μsec in this embodiment).

$$K_L = 2 \cdot \pi \cdot f_L \cdot \Delta t \quad (7)$$

In this way, LPF arithmetic operations are carried out for both the X- and Y-axes as in the case of HPF arithmetic operations to produce the outcomes $L_x$ and $L_y$, which are sequentially stored as past data for the arithmetic operations for prediction.

In step S60, the CPU 23 compares the reading of the loop counter $C_L$ with the start count data $C_P$ for the restoration of a shaken image in order to establish a time for starting the operation of restoring a shaken image. If $C_L$ is greater than $C_P$, the CPU 23 moves to step S61 for the operation, whereas, if $C_L$ is smaller than $C_P$, it moves to step S67.

After proceeding to step S61 after the time of starting the operation of restoring a shaken image, the CPU 23 execute arithmetic operations for prediction to obtain predicted shake signals $P_x$ and $P_y$ for the X- and Y-axes respectively. Thereafter, the CPU 23 proceeds to step S62, where it restores the shake image along the X- and Y-axes by means of the shaken image restoring means.

Thereafter, in step S63, the CPU 23 compares the reading of the loop counter $C_L$ with the start count data $C_{ES}$ for the restoration of a shaken image in order to establish a time for starting the operation of film exposure. If $C_L$ is equal to $C_{ES}$, the CPU 23 moves to step S64, where it directs the iris diaphragm to open for film exposure, whereas, if $C_L$ is not equal to $C_{ES}$, it moves to step S65.

In step S65, the CPU 23 compares the reading of the loop counter $C_L$ with the start count data $C_{EE}$ for the restoration of a shaken image in order to establish a time for ending the operation of film exposure. If $C_L$ is equal to $C_{EE}$, the CPU 23 moves to step S64, where it directs the iris diaphragm to close to terminate film exposure, whereas, if $C_L$ is not equal to $C_{EE}$, it moves to step S67.

If the CPU 23 moves to step S67, it controls the D/A converter 21 so that the output of the operational amplifier 20 would not be saturated. More specifically, the CPU 23 firstly determines if the absolute value of the outcome Hx of the HPF arithmetic operations for the X-axis is greater than $H_M$ set as the upper limit for HPF data. If $H_M$ is smaller than the absolute value of $H_x$, the CPU 23 goes to step S68 to control the D/A converter 21.

Since the HPF arithmetic operations for $H_x$ and $H_y$ are carried out in step S58, the absolute value of $H_x$ is equal to 0 before "yes" is given so that the CPU 23 can go through the step S54. In other words, the CPU 23 goes through step S67 as "yes" is always given there before it moves to step S68 to control DAx. Note that DAx is controlled by following steps S14 through S24 of the flow chart of FIG. 13. This control operation is carried out to correct both D/A data and A/D data as described earlier.

The reason why the operation of controlling the D/A converter 21 is suspended depending on the outcome of HPF arithmetic operations is to avoid unnecessary alterations in the reference voltage when the apparatus experiences an extreme shake as it is subjected to large impact and also avoid offsets during HPF arithmetic operations by evenly generating HPF input signals.

Similar processing operations are carried out in step S69 for the Y-axis. More specifically, the CPU 23 firstly determines if the absolute value of the outcome $H_y$ of the HPF arithmetic operations for the Y-axis is greater than $H_M$ set as the upper limit for HPF data. If only $H_M$ is smaller than the absolute value of $H_x$, the CPU 23 goes to step S70 to control the D/A converter 21.

After completing the operation of controlling the D/A converter 21 for both X- and Y-axes, the CPU 23 moves to steps S71 and 72, where it stores AD data $x_0$ and $y_0$ respectively in registers $x_1$ and $y_1$ as the last A/D conversion data for the next HPF arithmetic operations.

Then, in step S73, the CPU 23 determines if the mirror-up operation is completed or not. If not, it returns to step S52, whereas, if yes, it moves to step S74, where it determines if the operation of driving the iris diaphragm is completed or not. If not, the CPU 23 returns to step S52.

If, in steps S73 and 74, it is found that both the mirror-up operation and the operation of driving the iris diaphragm are over, the CPU 23 moves to step S72, where it increment the reading of the loop counter $C_L$ by 1 and then returns to step S52 to repeat the above operation.

In this way, the CPU 23 operates appropriately according to the reading of the loop counter $C_L$ in the exposure routine for the above described third embodiment. Consequently, the sensor operates accurately and properly to detect a shake signal without being affected by the instability observed in the initial stages of operation so that the image taken by the camera can get rid of degradation by a shake.

While the sensor and the amplifier are energized in the exposure routine after the second release operation in the above description for the third embodiment, the flow charts of FIGS. 16 and 17 may alternatively be used.

Referring to FIG. 16, the entire program comprises a focusing adjustment routine B where, after the operation of detecting the first release (step S83), the D/A converter 21 is controlled (step S84) by interrupt while adjusting the focus and an exposure routine B realized by removing the operation of energizing the sensor and the amplifier from the exposure routine of FIG. 15 (step S86). Note that steps S81, S82, S85, S87 and S88 are same as those of steps S31, S32, S35, S37 and S38 of the flow chart of FIG. 14 described earlier.

The focusing adjustment routine B of FIG. 17 has steps of energizing the sensor and the amplifier (step S91) and measuring the distance up to the target (step S93) after setting a D/A control interrupt (step S92). If, after comparing the detected off-focus status and the tolerance, the former is found out of the tolerance, the amount of driving the focus group is calculated (step S95) to drive the focus group (step S96). If, on the other hand, the detected off-focus status is found within the tolerance, interrupt is disabled and the CPU 23 returns to the proper course.

With this arrangement, the time period required for the sensor to become stabilized after the start of operation can be confined within the time period required for focusing, the time before the start of exposure can be made short in the exposure routine.

Alternatively, the sensor and the amplifier may be energized by operating various switched including a power switch. With this arrangement, a shake signal can be obtained on a stabilized basis if the second release follows immediately after the first release.

While frequency is used to determine the stability of the sensor by checking if the frequency exceeds a predetermined number within a given period of time in the above embodiment, the technique of determining the stability of the sensor is not limited thereto. For example, the sensor may be judged to be in a stabilized state when the reference voltage gets to a level with which the sensor operated stably in the last operation after energizing at least one of the shake detecting sensor section, the differential amplification section and the reference voltage control section.

Thus, a shake detecting apparatus according to the present invention can be configured in different ways as specifically listed below.

(1) A shake detecting apparatus comprising:

a shake detecting sensor means for detecting a shake;

a reference voltage output means for producing a reference voltage;

a differential amplifying means for amplifying the difference between the output of said shake detecting sensor means and the reference voltage from said reference voltage output means;

a reference voltage control means for modifying the reference voltage produced by said reference voltage output means according to the output of said differential amplifying means; and a shake signal correcting means for correcting the output of said differential amplifying means according to the modification of said reference voltage by said reference voltage control means.

(2) A shake detecting apparatus comprising:

a shake detecting sensor means for detecting a shake;

a reference voltage output means for producing a reference voltage;

a differential amplifying means for amplifying the difference between the output of said shake detecting sensor means and the reference voltage from said reference voltage output means;

a reference voltage control means for modifying the reference voltage produced by said reference voltage output means according to the output of said differential amplifying means;

a shake signal correcting means for correcting the output of said differential amplifying means according to the modification of said reference voltage by said reference voltage control means; and a shake signal output specifying means for specifying the initial value for and the timing of producing a differential signal from said shake signal correcting means.

(3) A shake detecting apparatus comprising:

a shake detecting sensor means for detecting a shake;

a reference voltage output means for producing a reference voltage;

a differential amplifying means for amplifying the difference between the output of said shake detecting sensor means and the reference voltage from said reference voltage output means;

a reference voltage control means for modifying the reference voltage produced by said reference voltage output means according to the output of said differential amplifying means;

a shake signal correcting means for correcting the output of said differential amplifying means according to the modification of said reference voltage by said reference voltage control means; and a high-pass filter arithmetic means for removing changes in the shake signal of the apparatus caused by mild drifts through high-pass filter arithmetic operations on the basis of the output of said shake signal correcting means.

(4) A shake detecting apparatus comprising:

a shake detecting sensor means for detecting a shake;

a reference voltage output means for producing a reference voltage;

a differential amplifying means for amplifying the difference between the output of said shake detecting sensor means and the reference voltage from said reference voltage output means;

a reference voltage control means for modifying the reference voltage produced by said reference voltage output means according to the output of said differential amplifying means;

a shake signal correcting means for correcting the output of said differential amplifying means according to the modification of said reference voltage by said reference voltage control means;

a high-pass filter arithmetic means for performing arithmetic operations on the basis of the output of the shake signal correcting means; and a shake signal output specifying means for specifying the initial value for and the timing of producing a shake signal from either said shake high-pass filter arithmetic means or said shake signal correcting means.

(5) A shake detecting apparatus comprising:

a shake detecting sensor means for detecting a shake;

a reference voltage output means for producing a reference voltage;

a differential amplifying means for amplifying the difference between the output of said shake detecting sensor means and the reference voltage from said reference voltage output means;

an A/D converter means for digitizing the output of said differential amplifying means;

a reference voltage control means for modifying the reference voltage produced by said reference voltage output means according to the output of at least either said differential amplifying means or said A/D converter means;

a shake signal correcting means for correcting the output of said A/D converter means according to the modification of said reference voltage by said reference voltage control means;

a high-pass filter arithmetic means for performing arithmetic operations on the basis of the output of the shake signal correcting means; and a shake signal output specifying means for specifying the initial value for and the timing of producing a differential signal from either said shake high-pass filter arithmetic means or said shake signal correcting means.

(6) An image shooting apparatus comprising a differential amplification as described in one of (1) through (5) above.

(7) An image shooting apparatus comprising a means for restoring an image degraded by a shake, said means being realized by utilizing the shake detecting apparatus as described in one of (1) through (5) above.

(8) A still image shooting apparatus comprising a means for restoring an image degraded by a shake, said means being realized by utilizing the shake detecting apparatus as described in one of (1) through (5) above.

(9) A shake detecting apparatus as described in one of (1) through (5) above, wherein said shake detecting sensor means is an angular velocity detecting means comprising a shake gyro.

(10) A shake detecting apparatus as described in one of (1) through (5) above, wherein said sake detecting sensor means is an acceleration detecting means.

(11) A shake detecting apparatus as described in (2), (4) and (5) above, wherein said shake signal output specifying means transmits a shake signal output specifying signal as a result of timing an elapsed time since the start of energizing at least one of the shake detecting means, the differential amplifying means, the reference voltage output means and the reference voltage control means.

(12) A shake detecting apparatus as described in (2), (4) and (5) above, wherein said shake signal output specifying means transmits a shake signal output specifying means when the frequency of altering the reference voltage falls below a predetermined frequency since the start of energizing at least one of the shake detecting means, the differential amplifying means, the reference voltage output means and the reference voltage control means.

(13) A shake detecting apparatus as described in (2), (4) and (5) above, wherein said shake signal output specifying means transmits a shake signal output specifying means when the output of the reference voltage output means reaches the level at which its output is stabilized in last operation since the start of energizing at least one of the shake detecting means, the differential amplifying means, the reference voltage output means and the reference voltage control means.

(14) An image shooting apparatus as described in (6), (7) and (8) above, wherein at least one of the shake detecting means, the differential amplifying means, the reference voltage output means and the reference voltage control means is energized according to the operation of the operator for shooting an image.

(15) An image shooting apparatus as described in (6), (7) and (8) above, wherein at least one of the shake detecting means, the differential amplifying means, the reference voltage output means and the reference voltage-control means is energized according to a first release operation of depressing the release button by half.

(16) An image shooting apparatus as described in (6), (7) and (8) above, wherein at least one of the shake detecting means, the differential amplifying means, the reference voltage output means and the reference voltage control means is energized according to a second release operation of fully depressing the release button.

(17) A shake detecting apparatus comprising:

a shake detecting sensor means for detecting a shake;

a reference voltage output means for producing a reference voltage;

a differential arithmetic means for carrying out arithmetic operations for the difference between the output of the shake detecting sensor means and the reference voltage from the reference voltage output means;

a reference voltage control means for modifying the reference voltage produced by said reference voltage output means; and a shake signal correcting means correcting the output of said differential amplifying means according to the modification of said reference voltage by said reference voltage control means.

(18) A shake detecting apparatus as described in (17) above, wherein it further comprising an output authorizing means for authorizing said shake signal correcting means to operate for signal transmission at a timing when the output of said shake signal detecting sensor stabilizes.

(19) A shake detecting apparatus as described in (17) and (18) above, wherein it further comprises a high pass filter arithmetic means for executing high pass filter arithmetic operations on the output of said shake signal correcting means.

(20) A shake detecting apparatus as described in (17) through (19) above, wherein it further comprises an A/D converter means for digitize the output signal of said differential arithmetic means.

(21) An image shooting apparatus comprising a shake detecting apparatus according to the invention to eliminate the effect of a shake on the basis of said shake signal.

With the embodiments of (1) and (17) above, the shake signal can be effectively detected if the output of the shake detecting sensor contains drift components. With the embodiment of (2) above, the shake signal of the shake detecting sensor is not affected by the instability in the initial stages of operation and free from saturation. With the embodiment of (3) above, the shake signal can be detected by HPF arithmetic operations. With the embodiment of (4) above, the shake signal is not affected by the instability in the initial stages of operation and free from saturation, while it can be detected by HPF arithmetic operations. With the embodiment of (5) above, the shake signal is not affected by the instability in the initial stages of operation and its offset components can be removed without losing necessary and effective shake components by initializing HPF arithmetic data according to the shake signal output specifying signal. With any of the embodiments of (6) through (8) above, there is provided an image shooting apparatus comprising a shake detecting apparatus according to the invention so that the image shooting operation can be carried out without being affected by drifts in the shake signal. With the embodiment of (11), the shake signal can be obtained after the shake detecting sensor stabilizes with a relatively simple arrangement of the apparatus because the time required for the shake detecting sensor to stabilize is substantially constant and the shake signal is used after this time. With the embodiment of (12), the shake signal can be obtained after the shake detecting sensor stabilizes with a relatively simple arrangement of the apparatus because the shake signal is used after detecting that the frequency of altering the reference voltage is reduced or that the shake detecting sensor has stabilized. With the embodiment of (13), the shake signal can be used after stabilization with a relatively simple arrangement of the apparatus because the current status of the shake detecting sensor is compared with the stabilized state of the last operation. With the embodiment of (14), the output of the shake detecting sensor stabilizes before an image shooting operation to make the operator ready to become free of shake because the shake detecting sensor is energized well before the image shooting operation. With the embodiment of (15) the shake detecting sensor stabilizes earlier and reduce the energy consumption of the power source. With the embodiment of (16), the energy consumption of the power source can be minimized because the shake detecting sensor is energized when an image shooting operation starts. With the embodiment of (18), a stabilized shake signal can always be used. With the embodiment of (19), the effect of mild drifts can be eliminated. With the embodiment of (20), the shake signal can be processed with computer easily because the signal is digitized. With the embodiment of (21), the effect of shake can be eliminated because a stabilized shake signal is always used.

Thus, with a shake detecting apparatus according to the invention, the problems of conventional shake detecting apparatus such as that (1) the processing circuit of the sensor goes out of its processible voltage range once drifts occurs, (2) that a long time period is required before the effect of drifts is eliminated by an HPF, (3) that a complicated circuit configuration is required for the HPF for controlling the time constant, (4) that the null voltage has to be regulated for digital processing and (5) that drifts and offsets also occur in the amplifying circuits of the apparatus, so that the apparatus can operate accurately at high speed.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A shake detecting apparatus comprising:
    a shake detecting sensor means for detecting a shake and for outputting a shake detection signal responsive to the detected shake;
    a reference voltage output means for outputting a reference voltage;
    a differential amplifying means for amplifying a difference between the shake detection signal output by said shake detecting sensor means and the reference voltage output by said reference voltage output means, and for outputting a differential amplified signal;
    a reference voltage control means for modifying the reference voltage output by said reference voltage output means according to the differential amplified signal output by said differential amplifying means; and
    a shake signal correcting means for correcting the differential amplified signal output by said differential amplifying means according to the modified reference voltage output by said reference voltage output means, and for outputting a corrected differential amplified signal.

2. A shake detecting apparatus according to claim 1, further comprising a shake signal output setting means for setting a value and a timing of transmission of the corrected differential amplified signal output by said shake signal correcting means.

3. A shake detecting apparatus according to claim 2, further comprising means for supplying power to said shake detecting sensor means, said reference voltage output means, said differential amplifying means and said reference voltage control means; and wherein said shake signal output setting means comprises means for transmitting a shake signal output setting signal when a predetermined period of time has elapsed from a starting time at which at least one of said shake detecting sensor means, said reference voltage output means, said differential amplifying means and said reference voltage control means has been supplied with power.

4. A shake detecting apparatus according to claim 2, further comprising means for supplying power to said shake detecting sensor means, said reference voltage output means, said differential amplifying means and said reference voltage control means; and wherein said shake signal output setting means comprises means for transmitting a shake signal output setting signal when said reference voltage control means modifies the reference voltage output by said reference voltage output means with a frequency below a predetermined frequency measured from a starting time at which at least one of said shake detecting sensor means, said reference voltage output means, said differential amplifying means and said reference voltage control means has been supplied with power.

5. A shake detecting apparatus according to claim 2, further comprising means for supplying power to said shake detecting sensor means, said reference voltage output means, said differential amplifying means and said reference voltage control means; and wherein said shake signal output setting means comprises means for transmitting a shake signal output setting signal when the reference voltage output by said reference voltage output means is stabilized following a starting time at which at least one of said shake detecting sensor means, said reference voltage output means, said differential amplifying means and said reference voltage control means has been supplied with power.

6. A shake detecting apparatus according to claim 1, further comprising a high-pass filter arithmetic means for removing changes in the shake detection signal output by said shake detecting sensor means, said changes being caused by mild drifts through high-pass filter arithmetic operations, and said high-pass filter arithmetic means removing said changes responsive to the corrected differential amplified signal output by said shake signal correcting means.

7. A shake detecting apparatus according to claim 6, further comprising a shake signal output setting means for setting a value and a timing of transmission of the corrected differential amplified signal output by said shake signal correcting means.

8. A shake detecting apparatus according to claim 7, further comprising means for supplying power to said shake detecting sensor means, said reference voltage output means, said differential amplifying means and said reference voltage control means; and wherein said shake signal output setting means comprises means for transmitting a shake signal output setting signal when a predetermined period of time has elapsed from a starting time at which at least one of said shake detecting sensor means, said reference voltage output means, said differential amplifying means and said reference voltage control means has been supplied with power.

9. A shake detecting apparatus according to claim 6, further comprising means for supplying power to said shake detecting sensor means, said reference voltage output means, said differential amplifying means and said reference voltage control means; and wherein said shake signal output setting means comprises means for transmitting a shake signal output setting signal when said reference voltage control means modifies the reference voltage output by said reference voltage output means with a frequency below a predetermined frequency measured from a starting time at which at least one of said shake detecting sensor means, said reference voltage output means, said differential amplifying means and said reference voltage control means has been supplied with power.

10. A shake detecting apparatus according to claim 6, further comprising means for supplying power to said shake detecting sensor means, said reference voltage output means, said differential amplifying means and said reference voltage control means; and wherein said shake signal output setting means comprises means for transmitting a shake signal output setting signal when the reference voltage output by said reference voltage output means is stabilized following a starting time at which at least one of said shake detecting sensor means, said reference voltage output means, said differential amplifying means and said reference voltage control means has been supplied with power.

11. A shake detecting apparatus according to claim 1, wherein said reference voltage control means comprises means for raising or lowering the reference voltage output by said reference voltage output means by a predetermined amount according to the differential amplified signal output by said differential amplifying means.

12. A shake detecting apparatus according to claim 1, wherein said reference voltage control means comprises:

means for raising the reference voltage output by said reference voltage output means by a predetermined amount when the differential amplified signal output by said differential amplifying means exceeds a predetermined value; and means for lowering the reference voltage output by said reference voltage output means by a predetermined amount when the differential amplified signal output by said differential amplifying means falls below a predetermined value.

13. A shake detecting apparatus according to claim 1, wherein said shake detecting sensor means comprises an angular velocity detecting means including a shake gyro.

14. A shake detecting apparatus comprising:

a shake detecting sensor means for detecting a shake and for outputting a shake detection signal responsive to the detected shake;

a reference voltage output means for outputting a reference voltage;

a differential amplifying means for amplifying a difference between the shake detection signal output by said shake detecting sensor means and the reference voltage output by said reference voltage output means, and for outputting a differential amplified signal;

an A/D converter means for digitizing the differential amplified signal output by said differential amplifying means, and for outputting a digitized differential amplified signal;

a reference voltage control means for modifying the reference voltage output by said reference voltage output means according to one of the differential amplified signal output by said differential amplifying means and the digitized differential amplified signal output by said A/D converter means;

a shake signal correcting means for correcting the digitized differential amplified signal output by said A/D converter means according to the modified reference voltage output by said reference voltage output means, and for outputting a corrected differential amplified signal;

a high pass filter arithmetic means for executing high pass filter arithmetic operations on the corrected differential amplified signal output by said shake signal correcting means; and a shake signal output setting means for setting an initial value and a timing of operation of at least one of said shake high-pass filter arithmetic means and said shake signal correcting means.

15. A shake detecting apparatus according to claim 14, wherein said reference voltage control means comprises means for raising and lowering the reference voltage output by said reference voltage output means by a predetermined amount according to the differential amplified signal output by said differential amplifying means.

16. In an image forming apparatus, a shake detecting apparatus for detecting a shake comprising:

a shake detecting sensor means for detecting a shake and for outputting a shake detection signal responsive to the detected shake;

a reference voltage output means for outputting a reference voltage;

a differential amplifying means for amplifying a difference between the shake detection signal output by said shake detecting sensor means and the reference voltage output by said reference voltage output means, and for outputting a differential amplified signal;

a reference voltage control means for modifying the reference voltage output by said reference voltage output means according to the differential amplified signal output by said differential amplifying means; and a shake signal correcting means for correcting the differential amplified signal output by said differential amplifying means according to the modified reference voltage output by said reference voltage output means, and for outputting a corrected differential amplified signal.

17. An image forming apparatus according to claim 16, further comprising means for restoring an image degraded by a shake according to the corrected differential amplified signal output by said shake signal correcting means.

18. An image forming apparatus according to claim 16, wherein said image forming apparatus comprises means for forming a still image of an object.

19. An image forming apparatus according to claim 16, further comprising power supply means for supplying power to at least one of said shake detecting sensor means, said reference voltage output means, said differential amplifying means and said reference voltage control means.

20. An image forming apparatus according to claim 16, further comprising:
   a release button which can be depressed to initiate an image forming operation; and
   a power supply means for supplying power to at least one of said shake detecting sensor means, said reference voltage output means, said differential amplifying means and said reference voltage control means responsive to at least a partial depression of said release button.

21. A shake detecting apparatus comprising:
   a shake detecting sensor means for detecting a shake and for outputting a shake detection signal responsive to the detected shake;
   a reference voltage output means for outputting a reference voltage;
   a differential arithmetic means for carrying out arithmetic operations to determine a difference between the shake detection signal output by said shake detecting sensor means and the reference voltage output by said reference voltage output means, and for outputting a differential arithmetic signal;
   a reference voltage control means for modifying the reference voltage output by said reference voltage output means according to the differential arithmetic signal output by said differential arithmetic means; and
   a shake signal correcting means for correcting the differential arithmetic signal output by said differential arithmetic means according to the modified reference voltage output by said reference voltage output means, and for outputting a corrected differential arithmetic signal.

22. A shake detecting apparatus according to claim 21, further comprising an output authorizing means for authorizing said shake signal correcting means to operate upon stabilization of the shake detection signal output by said shake signal detecting sensor means.

23. A shake detecting apparatus according to claim 21, further comprising a high pass filter arithmetic means for executing a high pass filter arithmetic operation on the corrected differential arithmetic signal output by said shake signal correcting means.

24. A shake detecting apparatus according to claim 21, further comprising an A/D converter means for digitizing the differential arithmetic signal output by said differential arithmetic means.

25. A shake detecting apparatus according to claim 21, further comprising means for compensating for a shake detected by said shake detecting means according to the corrected differential arithmetic signal output by said shake signal correcting means.

26. A shake detecting apparatus for an image forming apparatus comprising:
   a shake detecting sensor for detecting a shake of said image forming apparatus and for outputting an analog shake detection signal responsive to the detected shake;
   an A/D converter for converting the analog shake detection signal output by said shake detecting sensor into a digital shake detection signal; and
   a CPU for receiving said digital shake detection signal from said A/D converter, said CPU including filter means for transmitting a signal component of said digital shake detection signal within a predetermined frequency band.

27. A shake detecting apparatus according to claim 26, further comprising a differential amplifying circuit coupled between said shake detecting sensor and said A/D converter.

28. A shake detecting apparatus according to claim 27, wherein said differential amplifying circuit includes first and second input terminals, the first input terminal of said differential amplifying circuit being connected to an output of said shake detecting sensor, and the second input terminal of said differential amplifying circuit being connected to a D/A converter for carrying out a D/A conversion of a reference digital signal output by said CPU.

29. A shake detecting apparatus according to claim 28, wherein said CPU transmits said reference digital signal to said D/A converter responsive to a detected magnitude of the digital shake detection signal output by said A/D converter, and includes means for correcting a signal according to the digital shake detection signal output by said A/D converter and said reference digital signal.

30. A shake detecting apparatus according to claim 26, further comprising a feedback circuit for controlling said A/D converter to digitize and output to the CPU only shake detection signals within a predetermined range.

31. A shake detecting apparatus according to claim 26, wherein said filter means of said CPU has a time constant which varies in accordance a period of time that has elapsed from a starting time at which power has been supplied to said CPU.

32. A shake detecting apparatus according to claim 26, wherein said predetermined frequency band at which said filter means of said CPU transmits signal components of said digital shake detection signal varies in accordance with an output of said CPU.

\* \* \* \* \*